(12) United States Patent
Ciancimino et al.

(10) Patent No.: US 8,011,825 B2
(45) Date of Patent: Sep. 6, 2011

(54) SMOOTHING MOTOR SPEED DURING MIXING

(75) Inventors: Rosario Ciancimino, Berrien Springs, MI (US); Wayne W. Conard, Saint Joseph, MI (US); Noah David Zelvis, Saint Joseph, MI (US); Ryan W. Mill, South Haven, MI (US)

(73) Assignee: Whrilpool Corporation, Benton Harbor, MI (US)

( * ) Notice: Subject to any disclaimer, the term of this patent is extended or adjusted under 35 U.S.C. 154(b) by 844 days.

(21) Appl. No.: 11/931,114

(22) Filed: Oct. 31, 2007

(65) Prior Publication Data
US 2009/0109792 A1    Apr. 30, 2009

(51) Int. Cl.
    *B01F 7/30*    (2006.01)
(52) U.S. Cl. .................. 366/206; 366/288; 366/601
(58) Field of Classification Search .............. 366/206, 366/288, 601
    See application file for complete search history.

(56) References Cited

U.S. PATENT DOCUMENTS

| | | | |
|---|---|---|---|
| 1,279,143 A | 9/1918 | Patterson | |
| 1,334,395 A | 3/1920 | Patterson | |
| 1,756,286 A | 4/1930 | Farrall et al. | |
| 2,452,142 A | 10/1948 | Pecker | |
| 2,929,010 A | 3/1960 | Lancaster et al. | |
| 3,169,395 A | 2/1965 | Enoch et al. | |
| 3,456,180 A * | 7/1969 | Athey et al. | 318/245 |
| 4,002,891 A | 1/1977 | Porter | |
| 4,146,652 A * | 3/1979 | Kahn et al. | 426/564 |
| 4,527,904 A | 7/1985 | Weetman | |
| 4,535,621 A | 8/1985 | Gervais et al. | |
| 4,568,193 A | 2/1986 | Contri et al. | |
| 4,704,035 A | 11/1987 | Kowalczyk | |
| 4,747,690 A | 5/1988 | Hayashi | |
| 4,766,766 A | 8/1988 | Ahlert et al. | |
| 4,790,665 A | 12/1988 | Hayashi | |
| 4,838,702 A | 6/1989 | Torimitsu et al. | |
| 5,145,252 A | 9/1992 | Oh | |
| 5,156,868 A | 10/1992 | Muntener et al. | |
| 5,200,220 A | 4/1993 | Capodieci | |
| 5,321,974 A | 6/1994 | Hemmings et al. | |
| 5,353,827 A | 10/1994 | Bouchard et al. | |
| 5,472,273 A | 12/1995 | Fowler et al. | |
| 5,541,855 A | 7/1996 | Enzler et al. | |
| 5,829,341 A | 11/1998 | Lin | |
| 5,906,432 A | 5/1999 | Wade et al. | |
| 6,145,373 A | 11/2000 | Tymchuck | |
| 6,472,650 B1 | 10/2002 | Kim et al. | |
| 6,656,515 B2 | 12/2003 | Lowry et al. | |
| 6,755,564 B2 | 6/2004 | Eiva | |
| 6,760,942 B2 | 7/2004 | Lee et al. | |
| 6,782,735 B2 | 8/2004 | Walters et al. | |
| 6,825,575 B1 | 11/2004 | Edelson | |
| 6,827,476 B2 | 12/2004 | Lowry et al. | |
| 7,056,582 B2 * | 6/2006 | Carbo et al. | 428/402 |
| 7,384,180 B2 | 6/2008 | Jarvinen et al. | |
| 7,882,734 B2 | 2/2011 | Ciancimino et al. | |
| 2006/0147592 A1 | 7/2006 | Kalaykov | |

FOREIGN PATENT DOCUMENTS

| | | |
|---|---|---|
| DE | 4037028 A1 | 5/1992 |
| EP | 428241 A1 | 5/1991 |
| EP | 555902 A1 | 8/1993 |
| WO | 99/20113 A1 | 4/1999 |

* cited by examiner

*Primary Examiner* — David L Sorkin
(74) *Attorney, Agent, or Firm* — Tara M. Hartman; McGarry Bair, PC

(57) ABSTRACT

A mixing system comprising a bowl, mixing element and motor. A mixing element is located within the bowl and is driven by a motor to impart mechanical energy to the foodstuff being mixed upon contact. A method for increasing the power to the motor comprises introducing additional current in advance of instantaneous loading.

6 Claims, 32 Drawing Sheets

| Medium French bread dough | Medium Wheat bread dough | Medium Pizza dough |
|---|---|---|
| 1 tbsp. salt | 3/4 cup powdered milk | 1/2 tbsp. salt |
| 1 tbsp. butter | 1/3 cup and 1 tbsp. brown sugar | 2 tsp. olive oil |
| 2 packages of active dry yeast | 2 tsp. | |
| 2.5 cups warm water | 1/3 cup oil | 1 cups warm water |
| 7 cups all purpose flour | 2 packages of active dry yeast | 2.5-3.5 cups all purpose flour |
| 2 tbsp. cornmeal | 2 cups warm water | 1 tbsp. cornmeal |
| 1 egg white | 5-6 cups whole wheat flour | |
| 1 tbsp. cold water | | |
| | | |
| Medium Banana Nut bread dough | Medium Sweet bread dough | Medium Honey Oatmeal bread |
| 1/3 cup shortening | 3/4 cup low fat milk | 2 tsp. salt |
| 1/2 cup sugar | 1/2 cup sugar | 1/3 cup butter |
| 2 eggs | 1.25 tsp. salt | 2 packages of active dry yeast |
| 1/2 tsp. salt | 1/2 butter | 1.5 cups water |
| 1 3/4 cups all purpose flour | 2 packages of active dry yeast | 1/2 cup honey |
| 1 tsp. baking powder | 1/3 cups warm water | 5.5-6.5 cups all purpose flour |
| 1/2 tsp. baking soda | 3 eggs | 1 cup quick cooking oats |
| 1 cup mashed ripe banana | 5.5-6.5 | 2 eggs |
| 1/2 cup chopped walnuts or pecans | | 1 egg white |
| | | 1 tbsp. oatmeal water |

Fig. 6

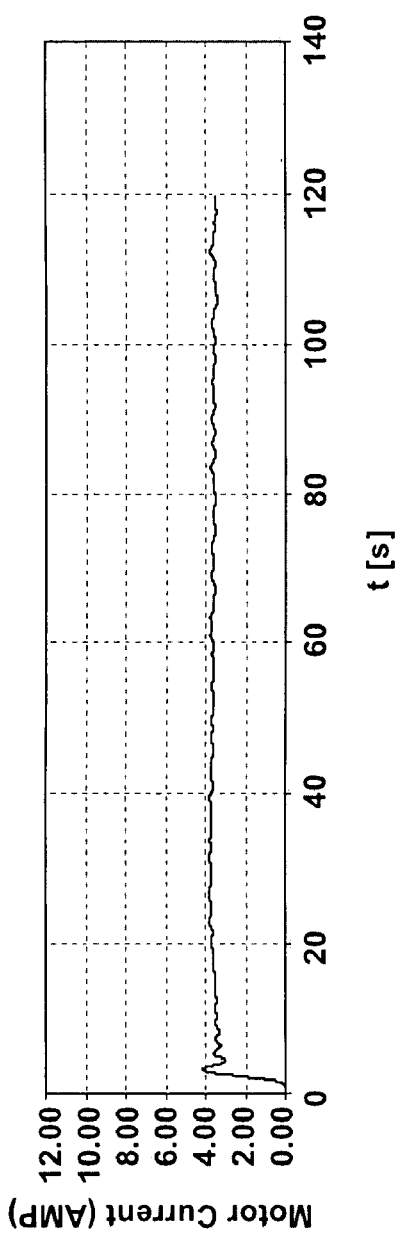
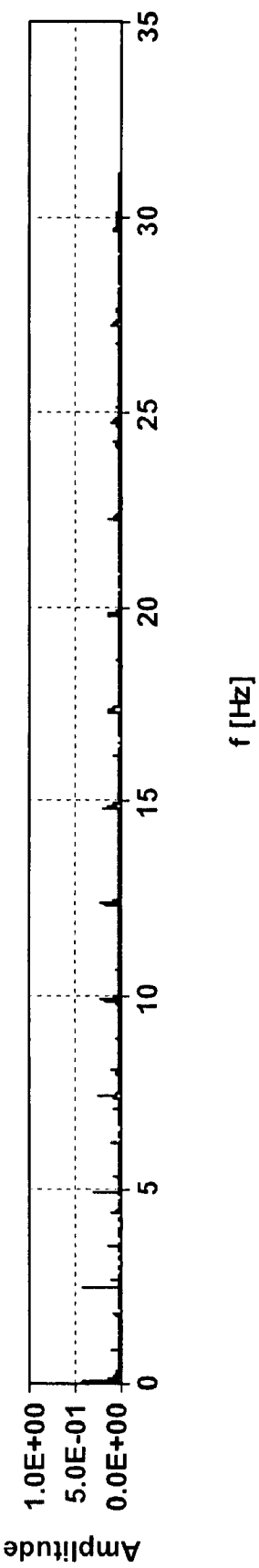
Fig. 9
Fig. 10

SMOOTHING MOTOR SPEED DURING MIXING

BACKGROUND OF THE INVENTION

1. Field of the Invention

The invention relates to a method for identifying the foodstuff being mixed in a mixing system. The invention further relates to a method of operation the mixing system based on the foodstuff identified.

2. Description of the Related Art

Mixing systems are ubiquitous. Though there are a wide variety of such mixers in the market they can be generally classified into two broad categories. The first category includes a lightweight portable variety of mixer often used for small amounts of material, and which are often referred to as hand-held mixers. The second type is a stand mixer, which compared to the hand mixer typically has a larger motor and a fixed mixing bowl and is used for mixing larger quantities and also may be used for kneading bread dough and mixing other heavy foodstuffs efficiently. The stand mixers typically have a mixing device, such as a dough hook to knead the dough, which extends into the bowl and is driven by the motor, which can typically be operated at multiple speeds.

There are many different types of bread dough, each of which has a different recipe. The recipes are formed of multiple steps with each step comprising the addition of one or more ingredients that are then mixed for a predetermined time at a predetermined speed. The user can sometimes get distracted during the mixing of the dough and forget where they are in the recipe. Therefore, it would be beneficial to be able to track the mixing process for the user.

The kneading of dough is one of the most difficult tasks that a mixing system performs because of the high forces required to knead the dough. The high forces create high instantaneous loads on the motor, which can result in audible mechanical and motor noises, vibrations, variable motor speeds, and use of greater amounts of current to knead the dough. All of these effects are undesirable for the consumer. The motor must also be sized to accommodate the instantaneous loads, which requires a larger motor than is otherwise necessary, which increases the cost to the consumer.

SUMMARY OF THE INVENTION

The invention relates to a method for smoothing the motor speed during mixing based on a prediction of the increased loading on the motor.

BRIEF DESCRIPTION OF THE DRAWINGS

In the drawings:

FIG. 6 is a table of medium sized recipes for French bread dough, Sweet bread dough, Wheat bread dough, Honey Oatmeal bread dough, Pizza dough, and Banana Nut bread dough.

FIG. 9 is a graphical representation of the filtered peak current data for a small sized recipe of White bread dough.

FIG. 10 is a graphical representation of the frequency analysis data for a small sized recipe of White bread dough.

DESCRIPTION OF AN EMBODIMENT OF THE INVENTION

Figure 1:
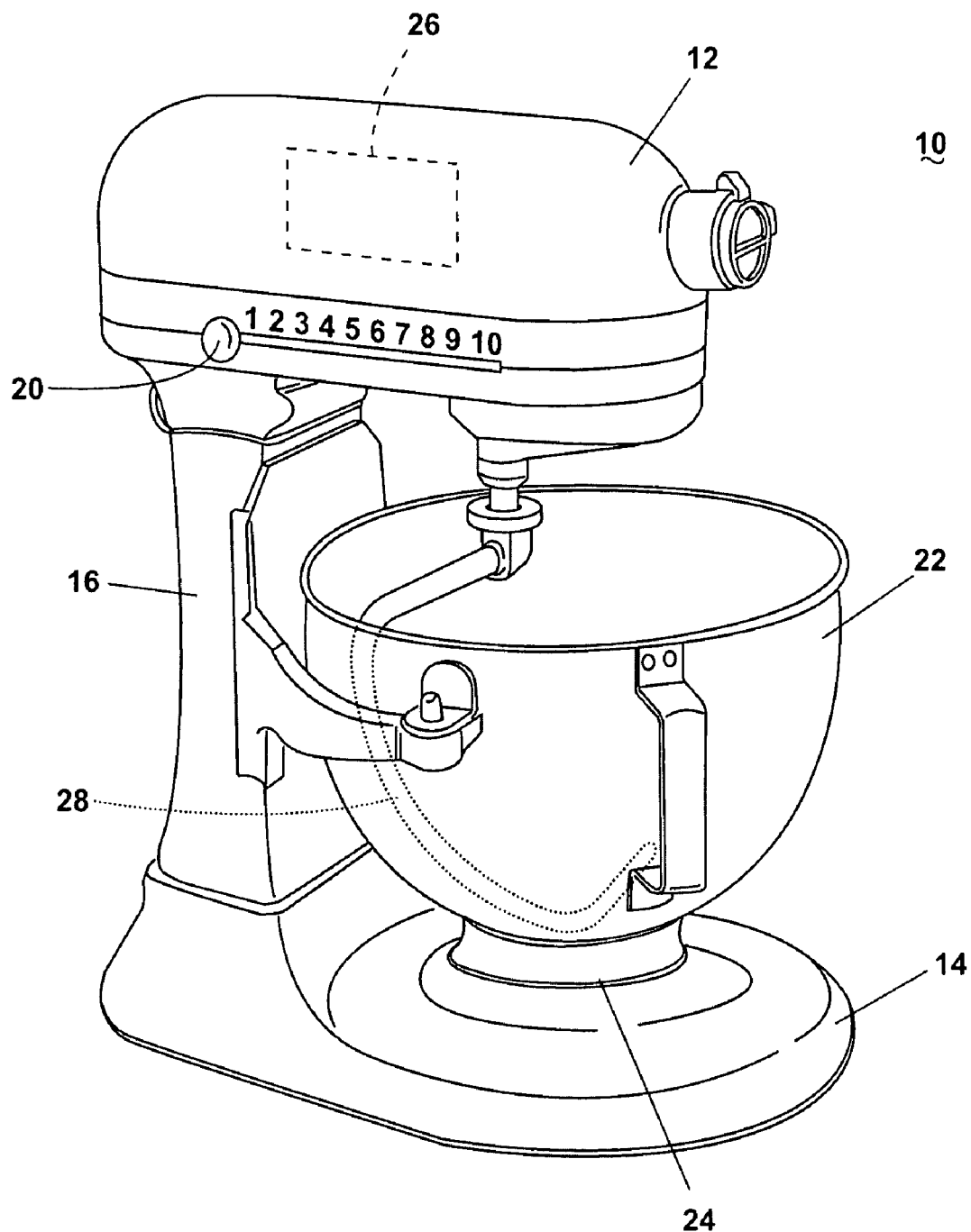
FIG. 1 is a perspective view of a mixing system in the form of a stand mixer according to the invention illustrating relevant components thereof, including a bowl, and a drive unit on which is mounted a dough hook partially shown in phantom.

FIG. 1 illustrates a mixing system according to the invention in the form of a stand mixer 10 comprising a mixer head 12 and a base 14 having an upstanding pedestal portion 16 supporting the mixer head 12. The mixer head 12 contains a motor 26 which is shown in phantom. The mixing system includes several releasably attached mixing elements to be attached to the mixer head 12 for rotation thereby. A mixing element in the form of a dough hook 28 is shown partially in phantom. Other mixing elements include a wire whip and a flat beater among other things. The motor 26 provides motive power to the dough hook mixing elements. The dough hook is connected to the mixing system by a shaft and has an outermost portion which is used to mix the foodstuff. These mixing elements mix food and other items in a mixer bowl 22, which is supported on the base 14.

Figure 2:
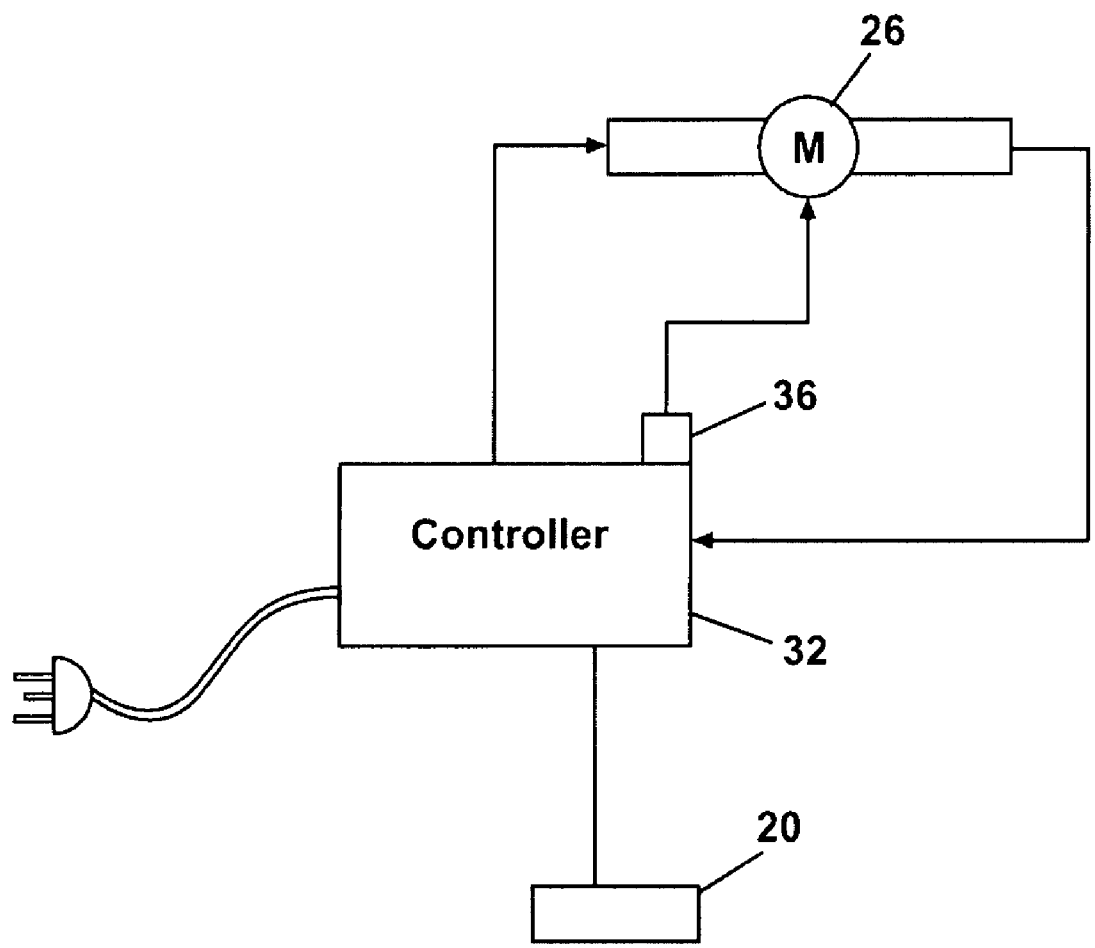
FIG. 2 is a diagram of the motor control for the mixing system of FIG. 1.

Referring also to FIG. 2, a controller 32 operably couples the motor 26 and a speed control knob 20 which is also mounted in the mixer head 12. The user sets the desired speed with the speed control knob 20 and the controller controls the motor to operate at the desired speed, which is treated as a set speed. Traditionally, the speed control knob is configured for multiple discrete speeds, but could easily be configured for continuously variable speed. Currently, and not limiting on the invention, the multiple discrete speeds are indexed from 0 to 10, with an increment of 1. On this traditional scale, bread dough is typically mixed at speed "2" throughout the entire process.

One or more well-known sensors 36 for monitoring operating characteristics of the motor, such as angular velocity (speed), current, voltage, torque, power and the like, may be operably coupled with the motor 26 and the controller 32. For purposes of the invention, the sensor 36 can form part of the controller 32 or can be separate from the controller 32. The controller 32 may be adapted to send and receive signals for controlling the operation of the mixer motor 26, receiving data from the sensors 36, processing the data, displaying information of interest to a user, and the like.

Figure 3:
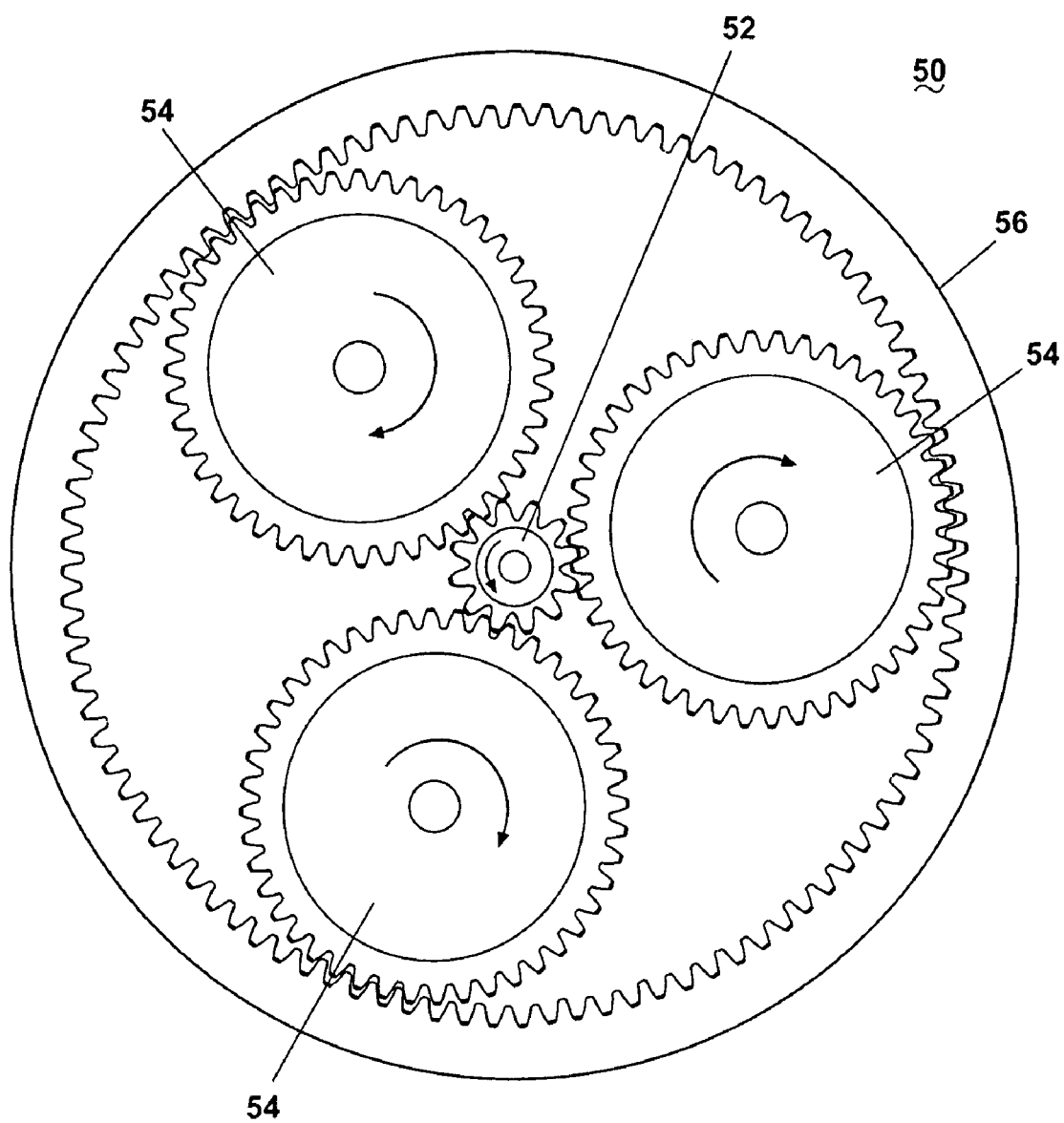
FIG. 3 is a view of a planetary gear system used to provide power from a motor to a mixing element.

FIG. 3 shows a planetary gear system used to transfer power from the motor to a mixing element. In the planetary gear system 50 a sun gear 52 is enmeshed with three planet gears 54, which are enmeshed with a ring gear 56 such that rotation of the sun gear 52 about its axis of rotation rotates the planet gears 54 about their respective axes of rotation. This in turn causes them to orbit around the sun gear 52. The shaft of the dough hook 28 is coupled to one of the planetary gears 54 such that the shaft of the dough hook 28 rotates with the planet gear 54 and orbits the sun gear 52 in the same manner as one of the planet gears 54.

The use of the planetary gear system to drive a mixing element, such as the dough hook, creates a complex rotational motion for the dough hook 28 because while the dough rotates along with the axis of rotation of the planetary gear 54 to which it is coupled and orbits about the axis of rotation of the sun gear 52.

Figure 4:
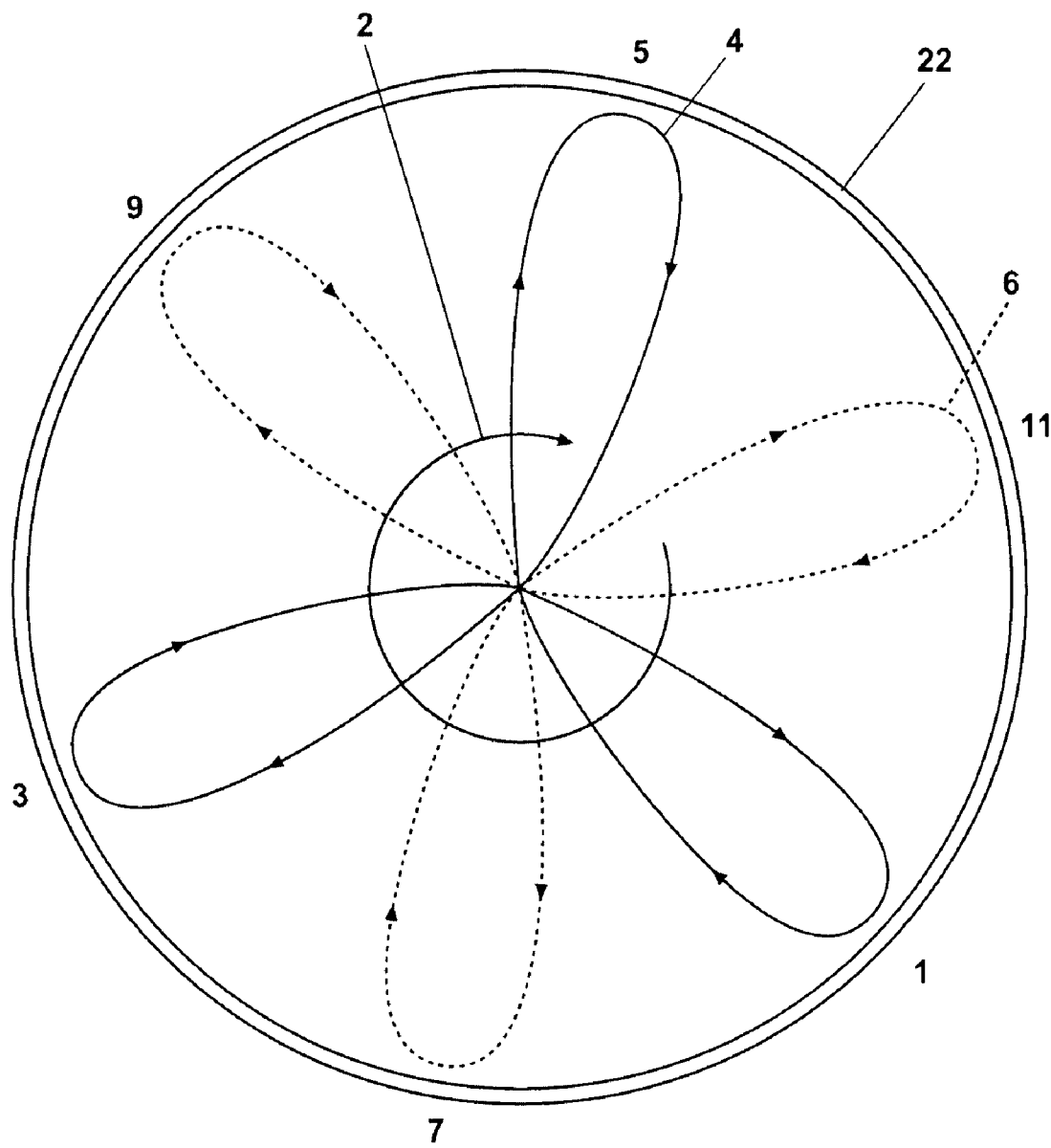
FIG. 4 is a schematic representation of the advancing oscillation of the dough hook 28.

FIG. 4 illustrates this complex rotational motion. The path that the dough hook 28 shaft takes inside the bowl is represented by line 2. Part of the path taken by the outermost point of the dough hook is shown as lines 4 and 6. For example, the first full planetary gear rotation and the correlating movements of the outermost portion of the dough hook 28 in the bowl 22 is schematically represented by line 4 while the second full planetary gear rotation and the correlating movements of the outermost portion of the dough hook 28 in the bowl 22 is schematically represented by line 6 which is shown in phantom. That is, the path taken by the outermost point advances relative to the bowl for each orbit about the sun gear and is not fixed relative to the bowl. Thus, the path of the outermost point is not repetitive.

As is easily seen in FIG. 4, this complex rotational movement creates several pinch points where the outmost point of the dough hook is at it closest point to the adjacent bowl. The pinch points in FIG. 4 are shown as points 1, 3, 5, 7, 9, and 11. The pinch point is where the distance is at a minimum between the bowl and the outermost point of the dough hook. The location of the pinch points is a physical feature of the mixing system and can vary depending on the type of mixing system. The mixing system may have a sensor that may determine the pinch point.

During all phases of the rotation of the dough hook, there is an intermittent grabbing and slipping of the dough with respect to the dough hook 28 and bowl 22 that results in an intermittent application of the weight of the foodstuff to the mixer motor 26, which amounts to a loading and unloading of the mixer motor 26. However, the pinch points are areas of highest loading for the motor. As the outermost point of the dough hook nears the pinch point, the foodstuff is compressed between the dough hook and the bowl, which requires more power from the motor to push through the dough. The controller will increase the current to the motor to temporarily increase the power to overcome the pinch point.

The timing, magnitude and frequency of the instantaneous loading may be impacted by several factors other than the pinch points. For example, the type and foodstuff being mixed impact the instantaneous loading. The amount of dough being mixed typically falls into any one of three standard sizes of a bread dough recipe. Each recipe will form a dough ball and the larger the dough ball formed the more inhibited the movement of the dough hook 28 within the bowl 22 and the greater the magnitude of the load being placed on the mixer motor 26. The gluten amount also varies in each different dough recipe; this is important as it relates to the elasticity of the dough and the resistance it provides. The more gluten in the dough the more elastic the dough becomes and the less resistance it offers.

Such instantaneous loading may have several different disadvantageous effects in the mixing system as the loading and unloading present themselves as a change in speed of the motor, audible noise and vibration. For example, the increased stress on the elements of the mixing system causes mechanical noise and vibration of the mixing system. The instantaneous loading may also slow the motor 26 and in turn the speed of the mixing element. In response to the slowing motor speed, the controller 32, which typically tries to move the motor 26 at a predetermined set speed for the given speed setting, will increase the current to the motor 26 to attempt to increase the torque and maintain the set speed. The additional motor current results in increased costs to the consumer and may also cause an audible noise to be emitted from the motor 26 as increased power is applied. If the loading is at its largest, typically at a pinch point, the noise can be disturbingly loud to the user and can substantially slow down the motor as the controller attempts to keep up with the intermittent loading.

Figure 5:
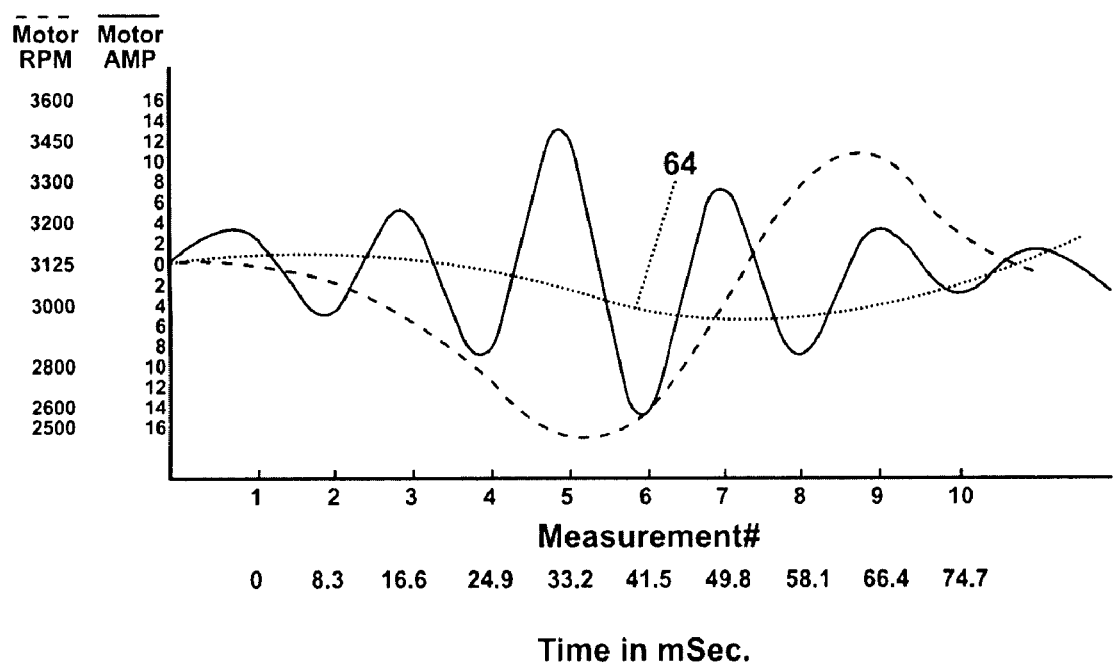
FIG. 5 is a graphical representation of motor speed and motor current for the mixer illustrated in FIG. 1 containing bread dough during a single oscillation of the mixing element in a single pinch point effect and a graphical representation of motor speed with an advanced current control applied.

FIG. 5 graphically illustrates a waveform of the motor speed during one movement of the mixing element 28 through a pinch point. The waveform of FIG. 5 is generated by sampling the motor speed, while the controller adjusts the motor speed, at a predetermined interval or sampling rate, which in this case constitutes 8.3 milliseconds. The waveform has a generally oscillating shape that is attributable to the controller response lagging behind the actual motor conditions, which leads to a repeating pattern of overshooting and undershooting the set point, which in this case is 3125 rpm. The maximum loading associated with the pinch point occurs around the fourth and fifth data points or around 24.9 ms to 33.2 ms, which is where the speed of the motor drops from the steady state oscillations to the low speed of data point 5. In response, the controller speeds up the motor as is illustrated by the current waveform near data point 5 to overcome the pinch point. However, as the controller lags, the motor overshoots the set speed at data point 7. By data point 9, the motor has gone through a series of corrections to return to the generally steady state oscillations.

FIG. 5 also graphically illustrates a waveform of the motor speed, shown as line 64, where the controller and control methodology of the invention predicts the upcoming pinch point and increases the motor current in anticipation, which has the effect of smoothing out the speed of the motor. The predictive application of current instead of the prior responsive application of current can be fine tuned to obtain a substantially constant motor speed. However, it has been found that such precision is not required to remedy many of the deleterious effects previously associated with the pinch points.

The controller 32 can be configured to identify the pinch points and increase the current to compensate for the speed loss associated with the pinch points. The controller can identify the pinch point from the motor characteristic data supplied by the sensor 36. For example, the maximum motor current identifies the pinch point. Only one pinch point need be identified as the physical locations of the pinch points are predictable because they physically repeat as previously described.

The amount of the correction can be accomplished in different manners. For example, the controller and its operation can be selected and configured along with any necessary sensors to "zero" out the speed variation. However, zeroing out the speed variation is not necessary to eliminate the deleterious effects of the speed variation for the pinch points. Thus, the extra cost of such a controller and sensors is not warranted. Noting that some speed variation is acceptable, it is only necessary to apply enough correction to keep the variation within an acceptable range that does not lead to the deleterious effects previously described. The controller can do this by monitoring the current as the mixer passes through the pinch point and increasing the current as necessary to the motor to keep the actual motor speed within an acceptable variation range. The controller could also increase the current a fixed amount in anticipation of the pinch points and in an amount great enough to ensure that the speed variation stays within the acceptable range. Other methods are also possible.

Regardless of the control method, the accuracy of the speed smoothing can be improved if the magnitude loading of the mixer is known or can be approximated in addition to knowing the timing of the anticipated loading, which can be determined from the location of the pinch points. Knowing or approximating the magnitude of the loading, especially the maximum loading, is difficult in the mixing environment because the loading is a function of the materials, as illustrated herein as the type of dough, being mixed. In the case of bread dough, the magnitude of the loading is a function of the type of dough and the amount of dough.

The invention provides a method for identifying the type of material being mixed. While described herein in terms of types of bread dough (White bread dough, French bread dough, Sweet bread dough, Wheat bread dough, Honey Oatmeal bread dough, Pizza dough, and Banana Nut bread dough), the identification of the material being mixed is not so limited.

An explanation of how a bread is made and the corresponding dough ball is formed will be helpful to understanding how the magnitude of the load can be known or predicted. Typically when making dough, multiple dough ingredients, which include all of the ingredients kneaded to collectively form the dough, are placed in the bowl 22 of the mixing system. In some recipes, additional flour may be added later on in the mixing process. For example, the following table lists the ingredients for making a medium sized batch of white bread dough.

TABLE 1

| Ingredients for medium sized white bread dough |
|---|
| ½ cup low fat milk |
| 3 tbsp. sugar |
| 2 tsp. salt |
| 3 tbsp. butter |
| 2 packages of active dry yeast |
| 1.5 cups warm water |
| 5-6 cups all purpose flour |

The recipes for medium batches of the other dough types described herein may be found in FIG. 6. Each may be identified in a small, medium or large size batch of dough. Medium is the size of each of the recipes indicated above while a small size is half of the recipe indicated, and a large size is one and a half times the recipe indicated.

In a basic white bread dough recipe the recipe directs the user to place the milk, sugar, salt and butter in a small sauce pan and to heat over low heat until the butter melts and the sugar dissolves and then to let the mixture cool to lukewarm. The recipe then directs the user to dissolve the yeast in warm water in the mixing bowl 22. The lukewarm milk mixture is then added to the bowl 22 along with four and a half cups of flour. The user then turns the mixing system on by selecting Speed 2 on the speed control knob and the ingredients are mixed for one minute. As the dough hook 28 moves, the individual ingredients are first loosely incorporated and then mix to form a ball of dough on the dough hook in the interior of the bowl 22. While the mixing system is still set on Speed 2 the remaining flour is added a half of a cup at a time. At this point the additional ingredients are mixed into the dough ball. This occurs after the ingredients are mixed for another minute and a half or until the dough starts to clean the sides of the bowl. At this point the dough ball is formed and is then kneaded at Speed 2 for another two minutes. The dough ball is then taken out of the mixing system for further preparation before baking.

Each dough making process has several main steps. The first step is where the ingredients are initially mixed. The second stage where the mixed ingredients start to form a dough ball. At this initial dough ball formation the load on the motor increases because of the dough ball being compressed as it moves through the pinch points and the increased frictional resistance between the dough ball, which is tacky, and the bowl. The maximum instantaneous loading tends to be located at the pinch points. The magnitude of the maximum instantaneous loading tends to increase until reaching a final kneading step that is common in all recipes. At the final kneading step, the dough ball is completely formed and is as tacky as it will become. It should be noted that some recipes like the basic white bread dough recipe have an additional step that occurs after the dough ball has formed initially and before the kneading process, this is the step where more flour is added.

Applicants have determined that motor current data may be used to identify the foodstuff being mixed in real-time. In this sense, the use of the data amounts to a real-time sensor placed in the mixing system for identifying what foodstuff is being mixed. Such sensors have never before been available. As motor speed tends to lag the motor current in a predictable manner, motor speed may also be used to identify the foodstuff being mixed. Therefore, while this explanation is in terms of the motor current, it should be understood that it applies to using motor speed data as well.

Figure 7:
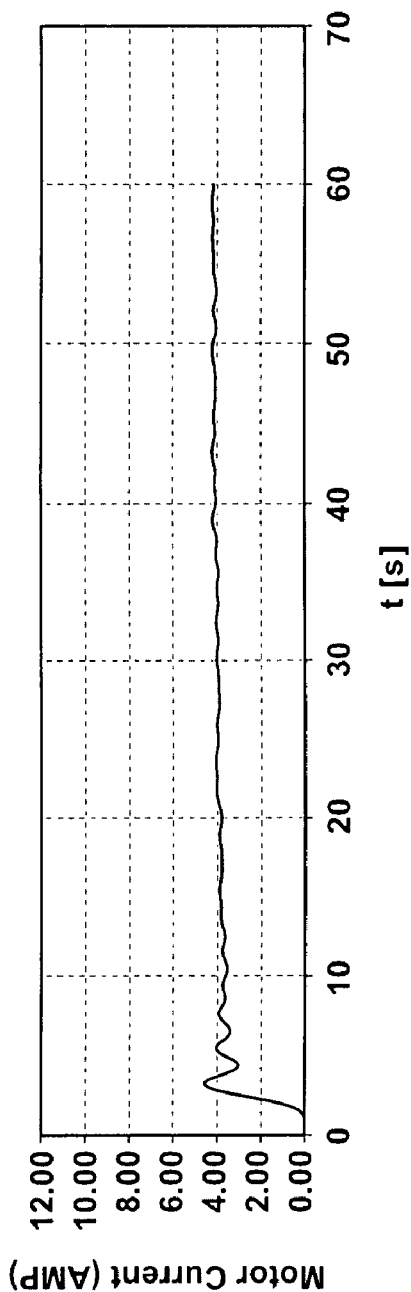
FIG. 7 is a graphical representation of the filtered peak current data for a medium sized recipe of White bread dough.

It has been found that each type of dough has its own distinct pattern of peak currents as does each dough size. FIG. 7 graphically represents the filtered peak current data for a medium sized batch of White bread dough. The peak current data has been filtered to remove electrical noise and the sampling rate equals 16 milliseconds. The intermittent pinch points of the dough ingredients and dough hook 28 transmits through the dough hook 28 to the drive motor 26, where it manifests as ripples in the waveform of the filtered peak motor current data. These ripples define a waveform having multiple peaks.

As way of a general description, the waveform begins with a large swing in the peak value which is attributable to the start-up of the motor and brings the motor up to the set speed while beginning to mix the recipe ingredients. These peaks are transient and lead into a more steady state operation. The next ripples in the waveform occur as the ingredients are initially mixed but are not incorporated into a dough ball. The ripples occur because ingredients are squeezed between some pinch points in the bowl and not others. The ripples then settle out as the dough ball initially forms and clings to the dough hook and a constant loading occurs during each pinch point. The peaks have greater magnitude when there is greater force being applied to the motor 26 which is associated with the mixing of the dough ingredients. The filtered peak current data may be stored by the mixer controller and may be used to calculate a frequency for the waveform.

The filtered peak motor current data provides an accurate identification of the dough ingredients being mixed. More specifically, the foodstuff can be identified by comparing the collected filtered peak data to predetermined recipe peak data profiles for each recipe type and recipe size. For example, the controller would essentially look for a match between the collected filtered peak current data and the predetermined recipe peak data profiles.

Figure 11:
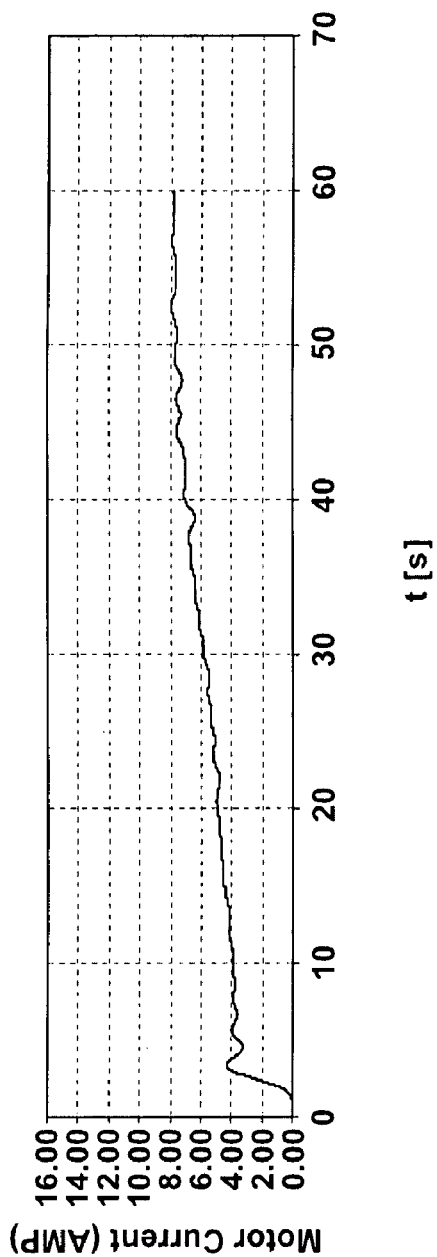
FIG. 11 is a graphical representation of the filtered peak current data for a large sized recipe of White bread dough.
Figure 13:
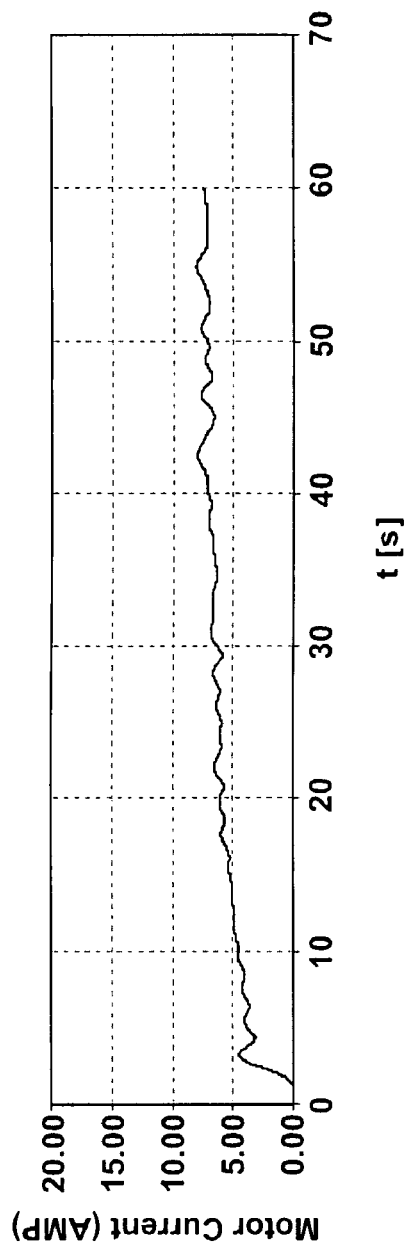
FIG. 13 is a graphical representation of the filtered peak current data for a medium sized recipe of French bread dough.
Figure 15:
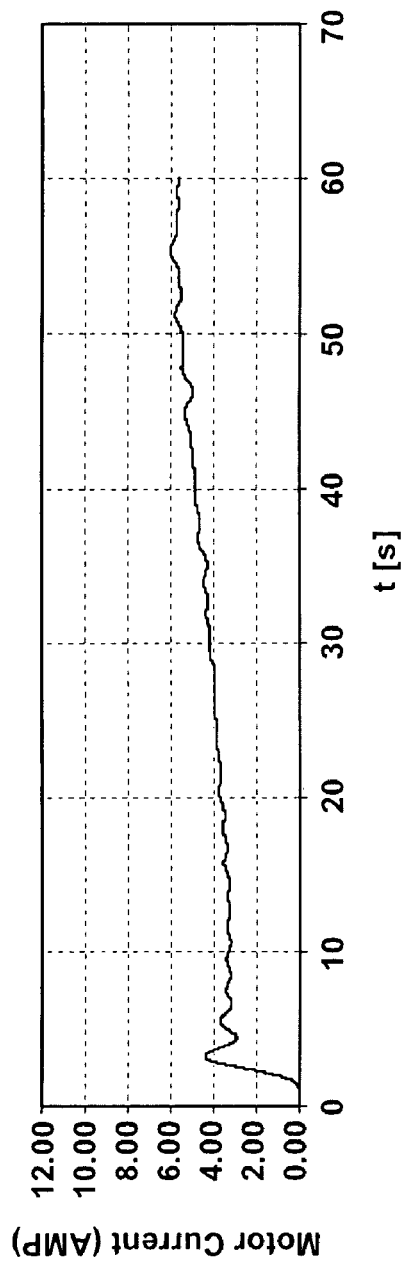
FIG. 15 is a graphical representation of the filtered peak current data for a medium sized recipe of Sweet bread dough.

A cursory review of the filtered current data for White bread dough of medium, small and large size shown in FIGS. 7, 9, and 11, respectively, illustrates that each size of the same dough has a different profile and that can be used to identify the size of the recipe being mixed. Similarly, a cursory review of the filtered current data for White bread, French bread, and Sweet bread dough of a medium size, FIGS. 7, 13, and 15, respectively, illustrates that each type of dough has a different profile and that can be used to identify the type of the recipe being mixed.

Figure 8:
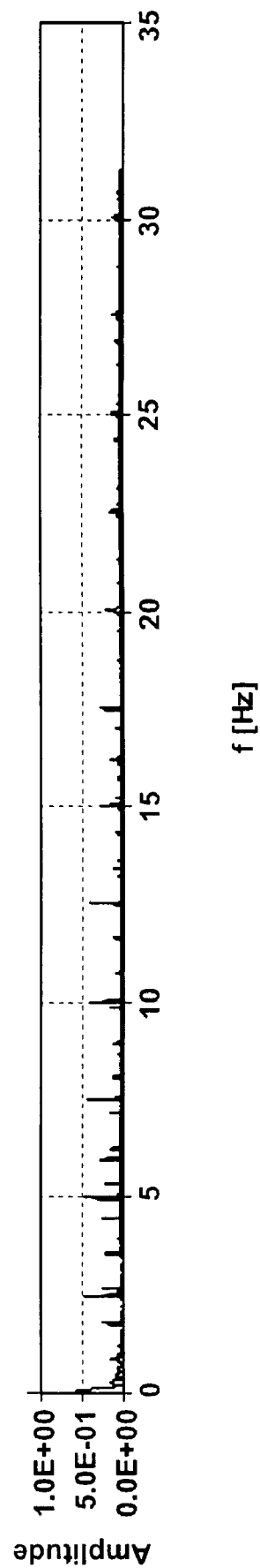
FIG. 8 is a graphical representation of the frequency analysis data for a medium sized recipe of White bread dough.
Figure 12:
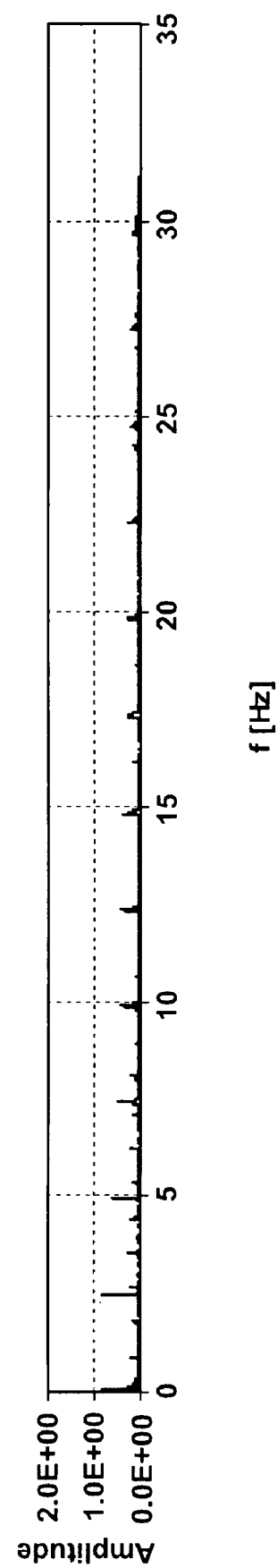
FIG. 12 is a graphical representation of the frequency analysis data for a large sized recipe of White bread dough.

However, applicants have discerned that viewing motor current data in the frequency domain provides much better resolution appropriate to identifying the type and size of the dough. FIGS. 8, 10, and 12 illustrate the frequency domain information of the current data shown in FIGS. 7, 9, and 11, respectively. The frequency domain can be determined using any appropriate method, such as a Fast Fourier Transform.

As illustrated by FIGS. 8, 10, and 12, it has been found that the frequency domain information from the motor current data creates a frequency domain profile that is unique for each of the dough types and sizes. For the dough-types describe herein, the most useful frequencies for identifying the types and size of dough are 0 Hz, 2.5 Hz, 3 Hz, and 6 Hz. Other frequencies may be necessary for other dough types and for recipes other than bread dough.

As can be easily seen the frequency profile has greater resolution relevant to determining the type and size of foodstuff being mixed, making the identification easier not just to the human eye, but also to a computer. The frequency domain data, such as prominent frequencies and their magnitude, can be tabulated and used as a reference. The tabulated data is also suitable for loading into the memory of a processor to be used as a reference value for real time comparisons. In this manner the collected frequency amplitude data may be compared to a predetermined reference profile.

Figure 14:
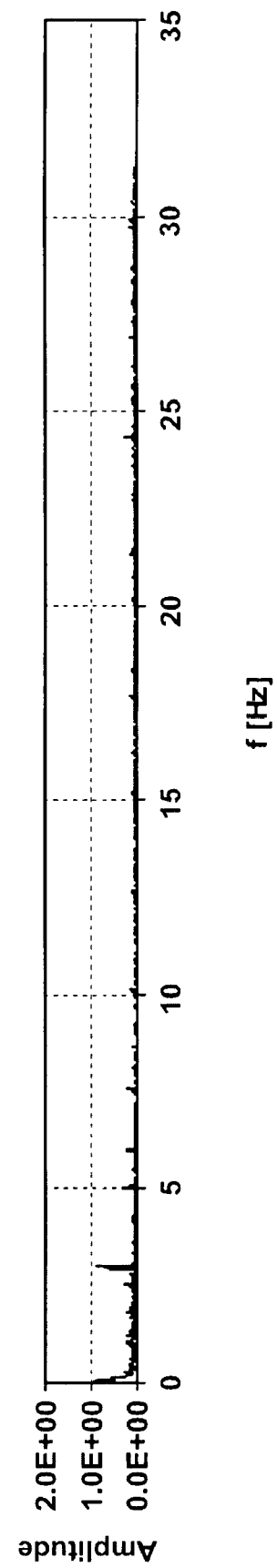
FIG. 14 is a graphical representation of the frequency analysis data for a medium sized recipe of French bread dough.
Figure 16:
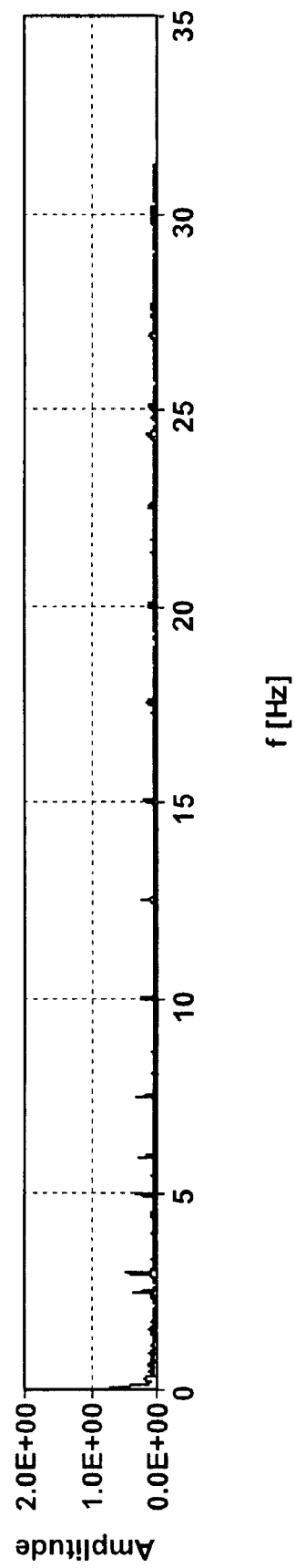
FIG. 16 is a graphical representation of the frequency analysis data for a medium sized recipe of Sweet bread dough.
Figure 17:
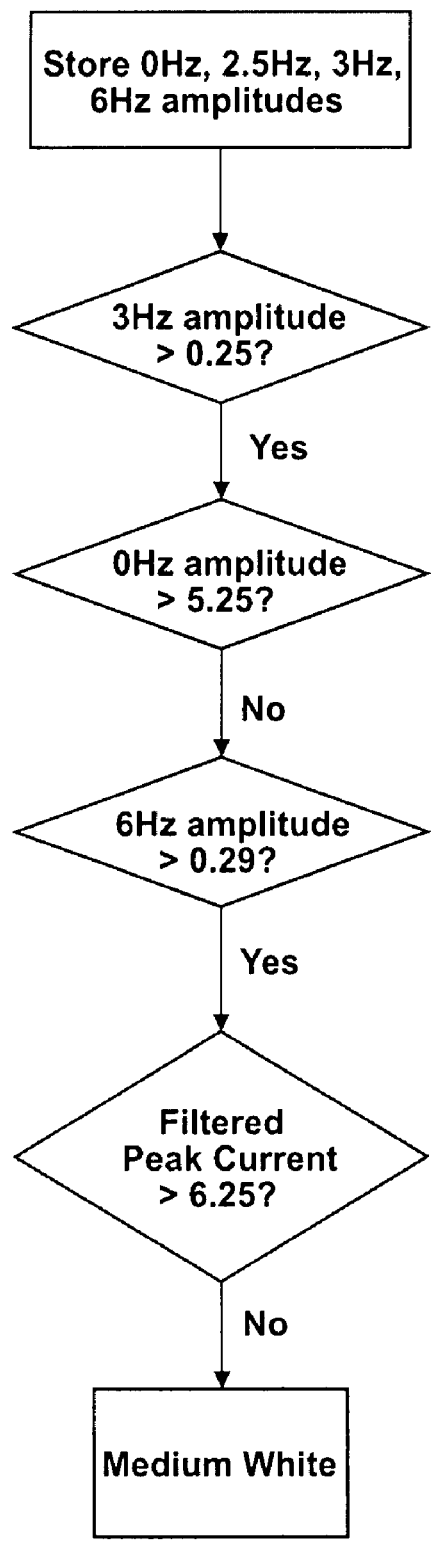
FIG. 17 is a schematic representation of the predetermined logic tree for identifying a medium sized recipe of White bread dough.
Figure 18:
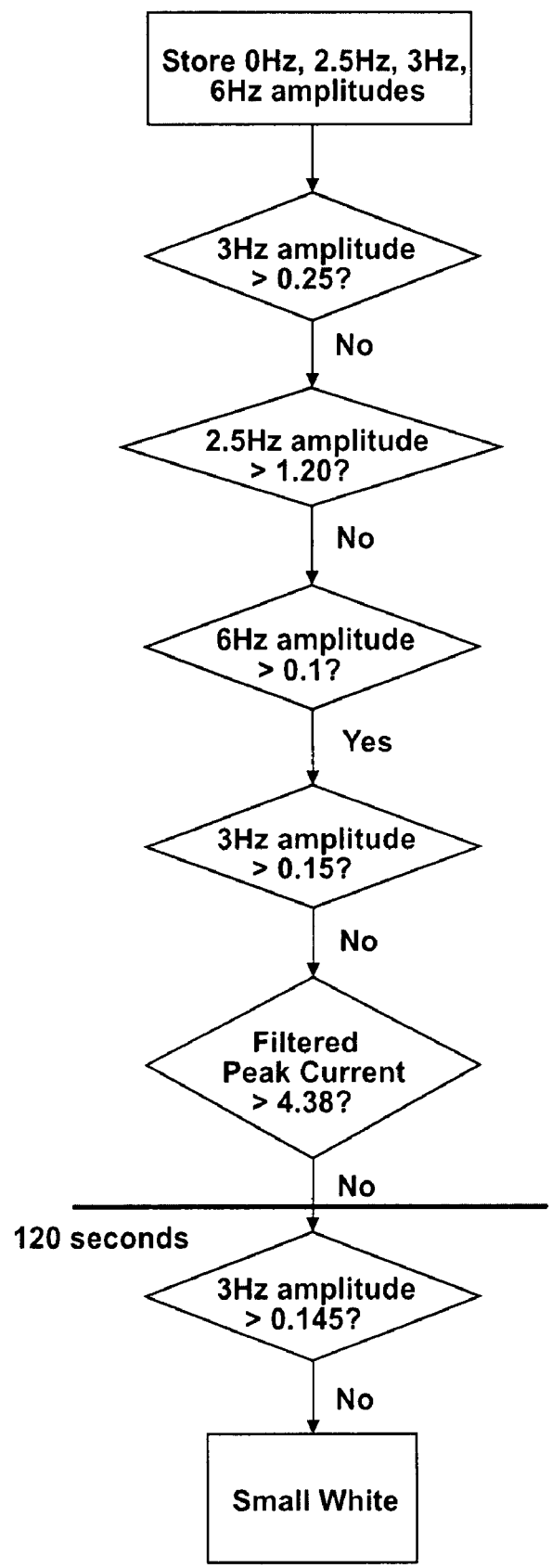
FIG. 18 is a schematic representation of the predetermined logic tree for identifying a small sized recipe of White bread dough.
Figure 19:
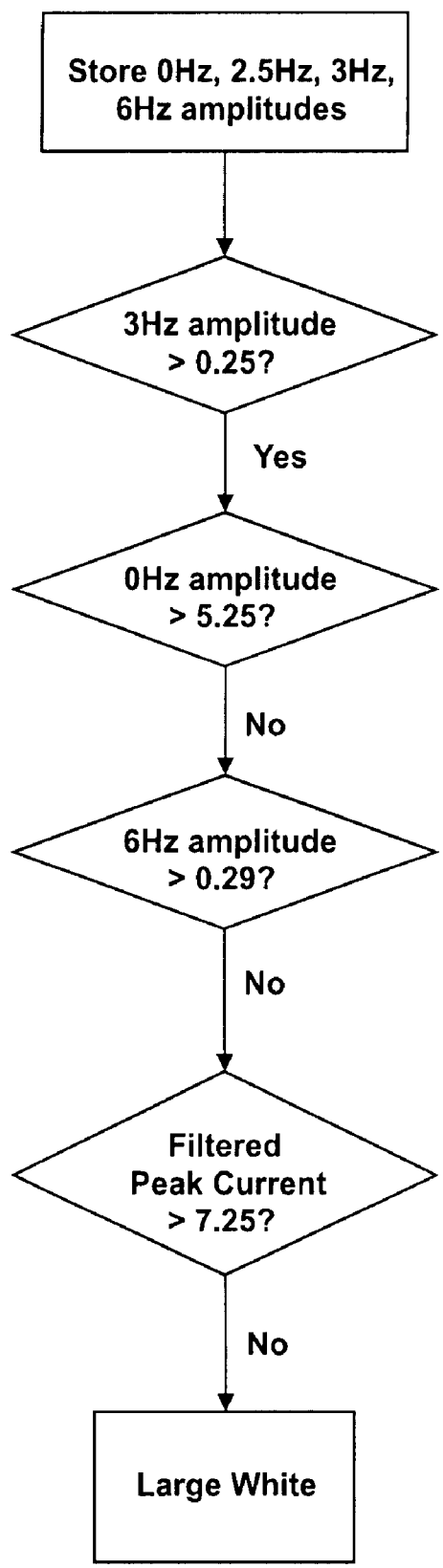
FIG. 19 is a schematic representation of the predetermined logic tree for identifying a large sized recipe of White bread dough.
Figure 20:
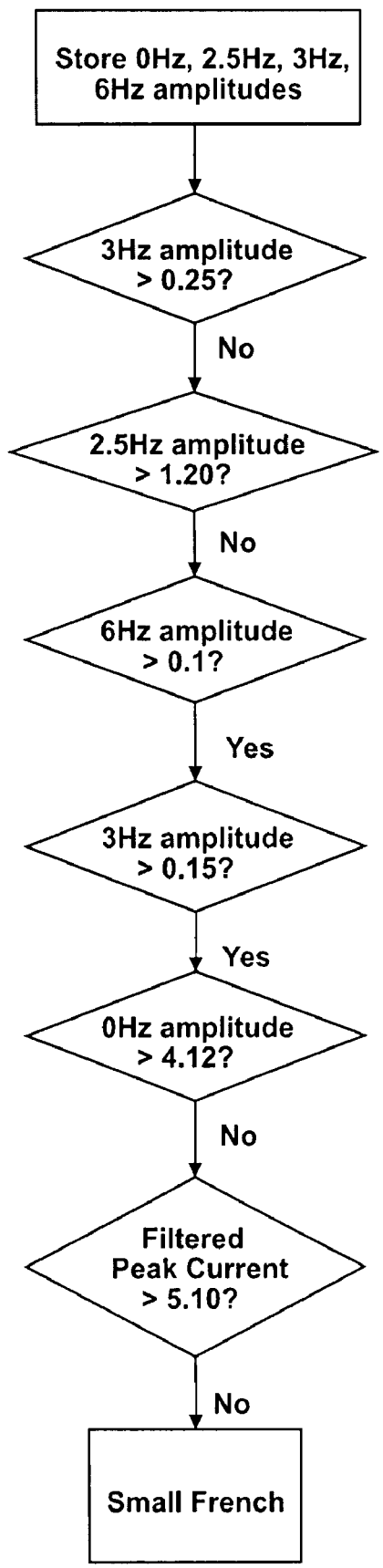
FIG. 20 is a schematic representation of the predetermined logic tree for identifying a small sized recipe of French bread dough.
Figure 21:
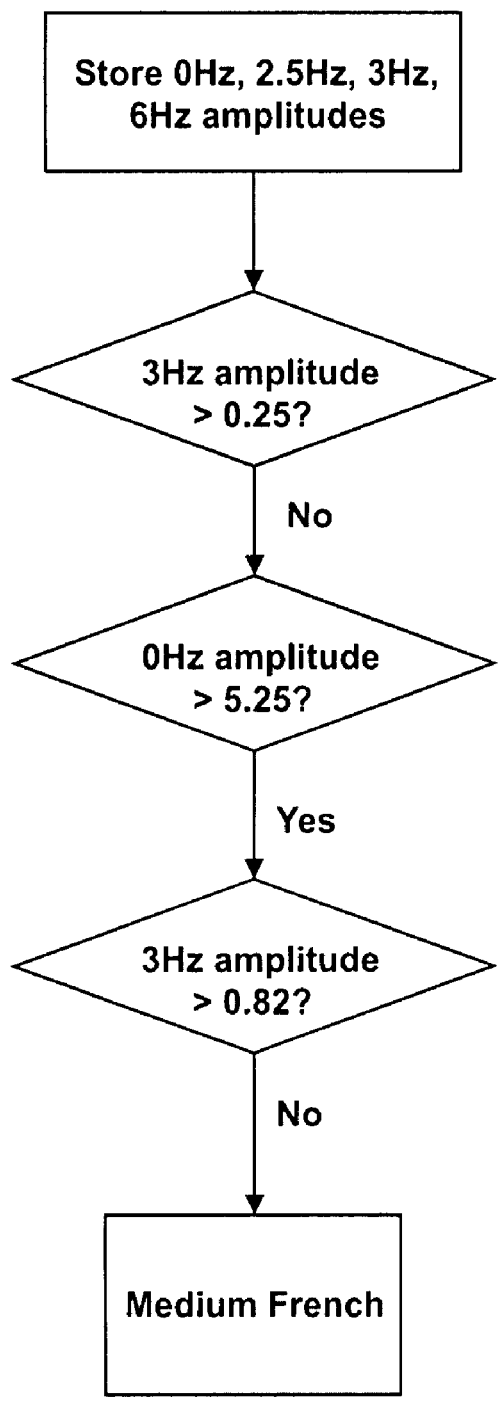
FIG. 21 is a schematic representation of the predetermined logic tree for identifying a medium sized recipe of French bread dough.
Figure 22:
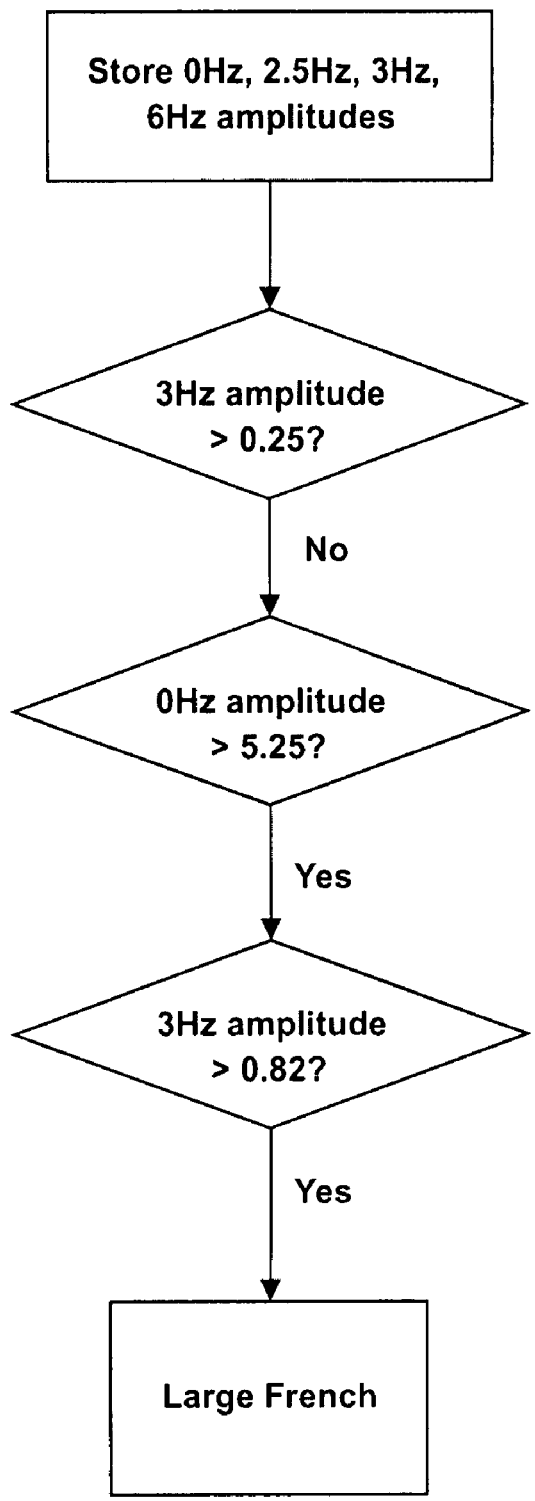
FIG. 22 is a schematic representation of the predetermined logic tree for identifying a large sized recipe of French bread dough.
Figure 23:
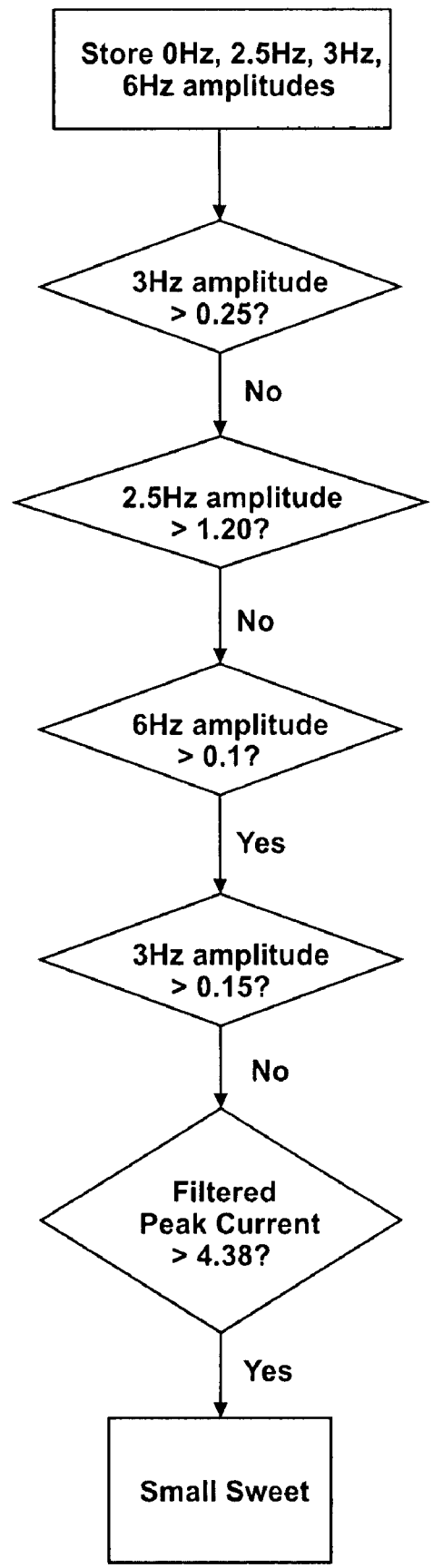
FIG. 23 is a schematic representation of the predetermined logic tree for identifying a small sized recipe of Sweet bread dough.
Figure 24:
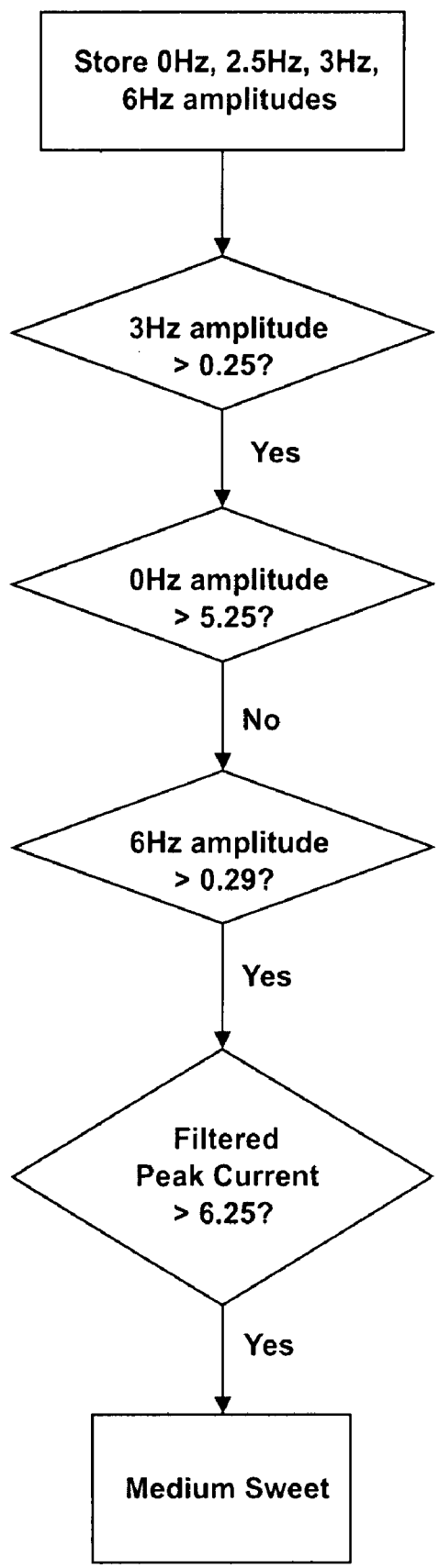
FIG. 24 is a schematic representation of the predetermined logic tree for identifying a medium sized recipe of Sweet bread dough.
Figure 25:
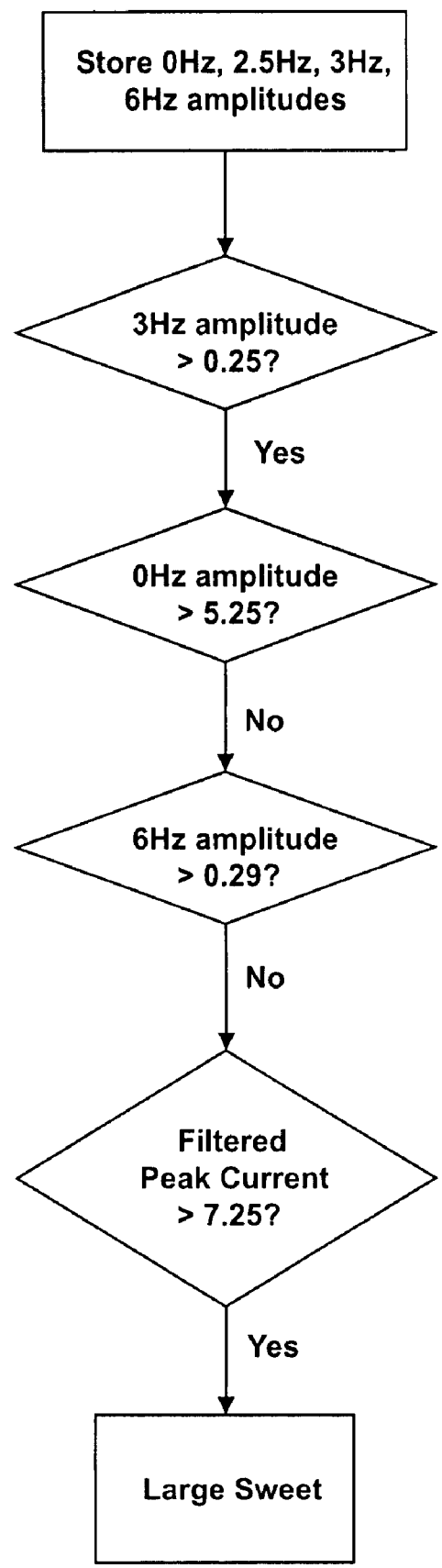
FIG. 25 is a schematic representation of the predetermined logic tree for identifying a large sized recipe of Sweet bread dough.
Figure 26:
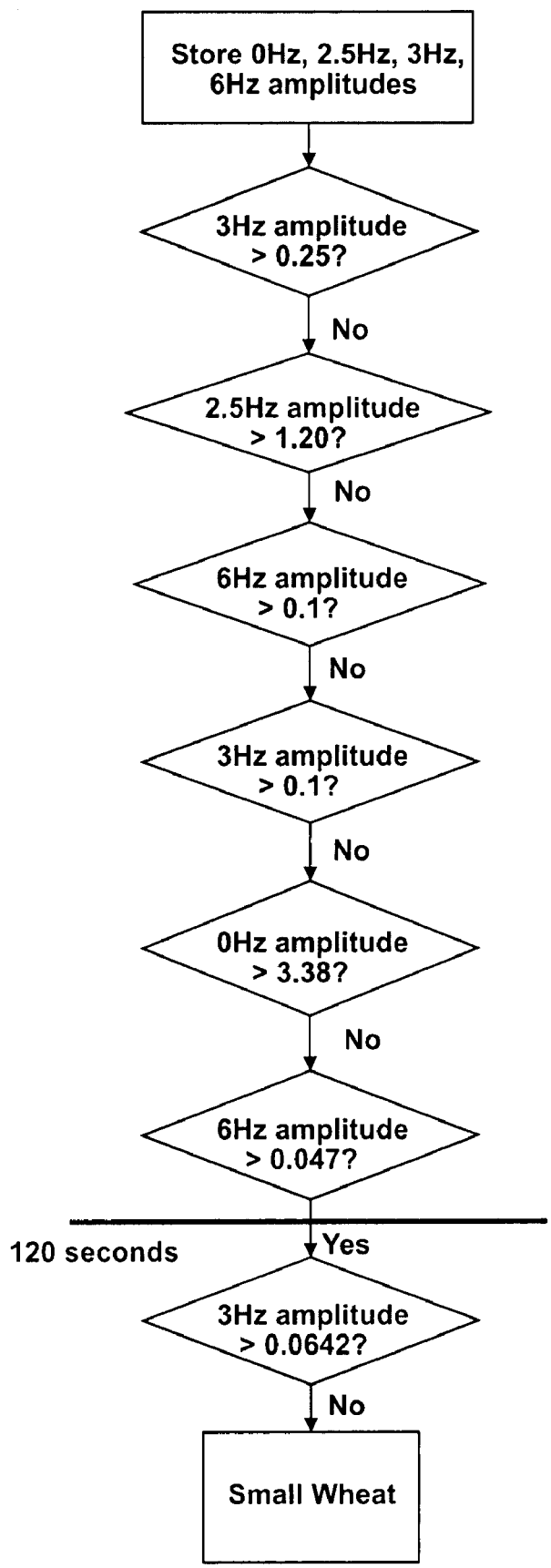
FIG. 26 is a schematic representation of the predetermined logic tree for identifying a small sized recipe of Wheat bread dough.
Figure 27:
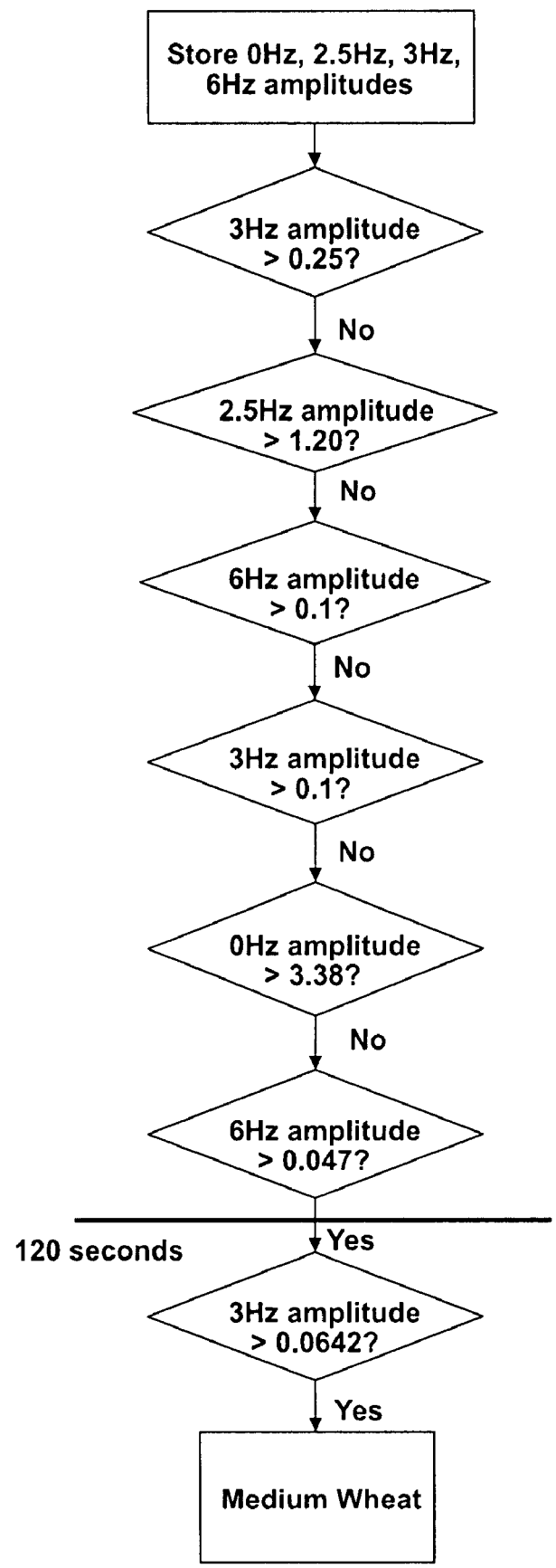
FIG. 27 is a schematic representation of the predetermined logic tree for identifying a medium sized recipe of Wheat bread dough.
Figure 28:
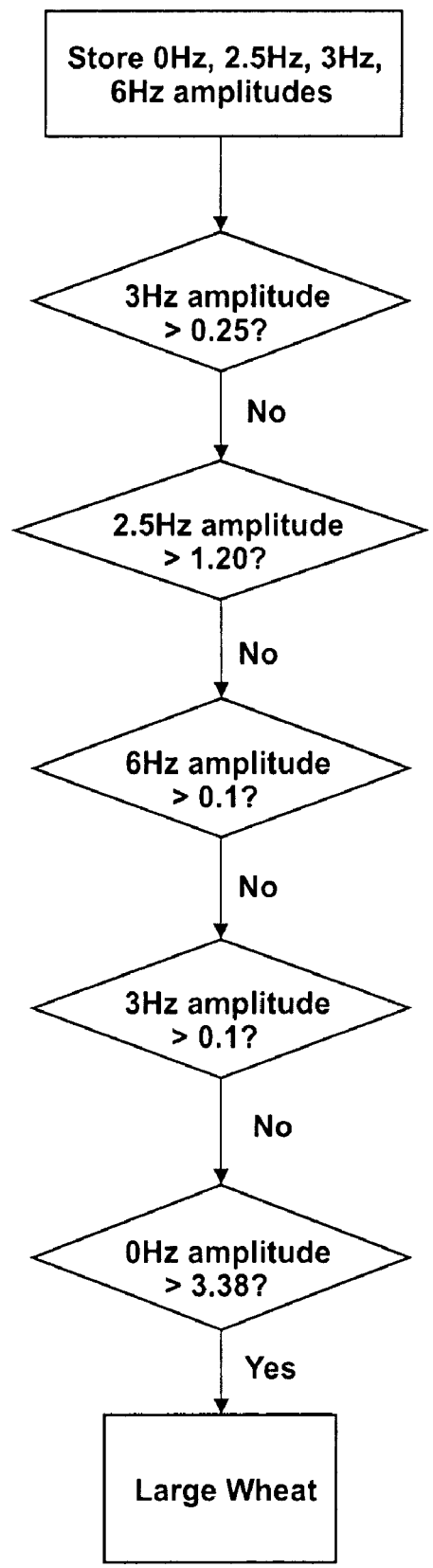
FIG. 28 is a schematic representation of the predetermined logic tree for identifying a large sized recipe of Wheat bread dough.
Figure 29:
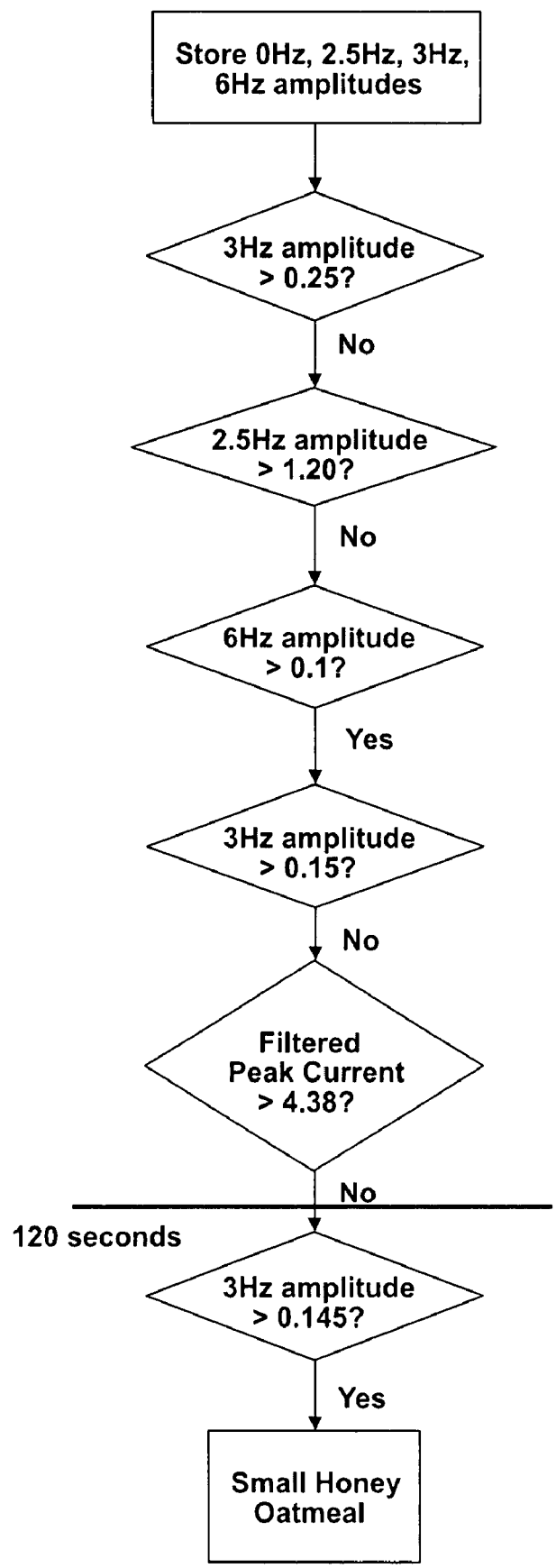
FIG. 29 is a schematic representation of the predetermined logic tree for identifying a small sized recipe of Honey Oatmeal bread dough.
Figure 30:
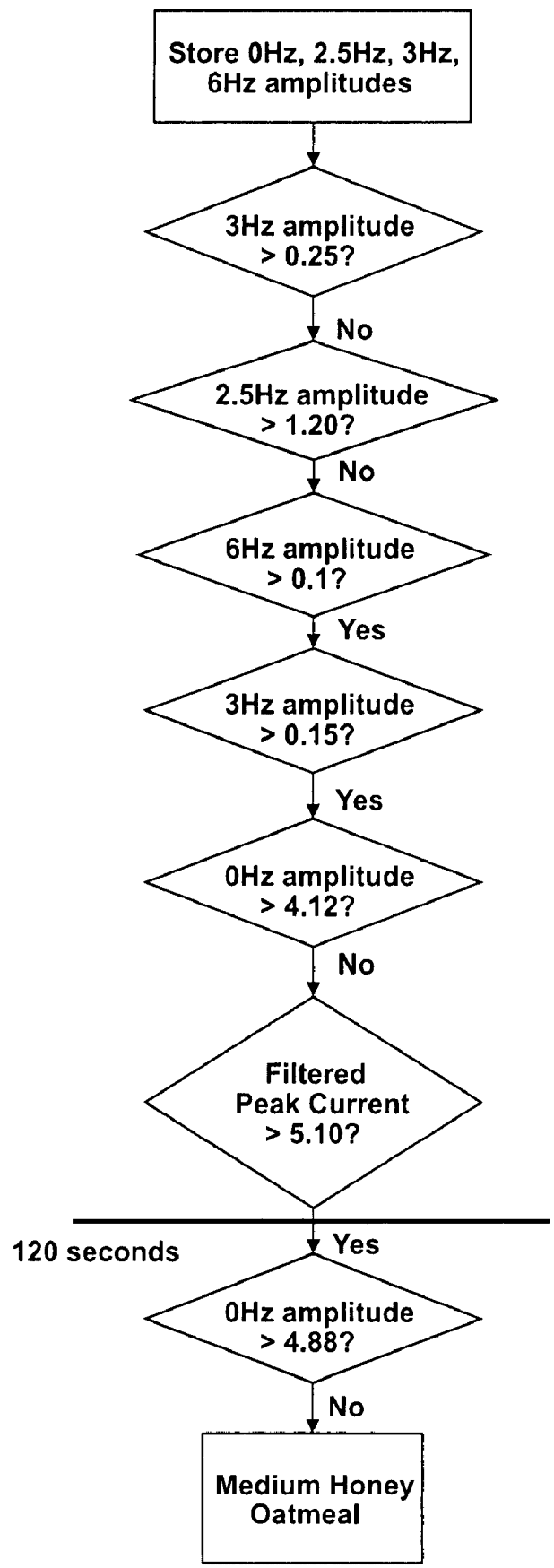
FIG. 30 is a schematic representation of the predetermined logic tree for identifying a medium sized recipe of Honey Oatmeal bread dough.
Figure 31:
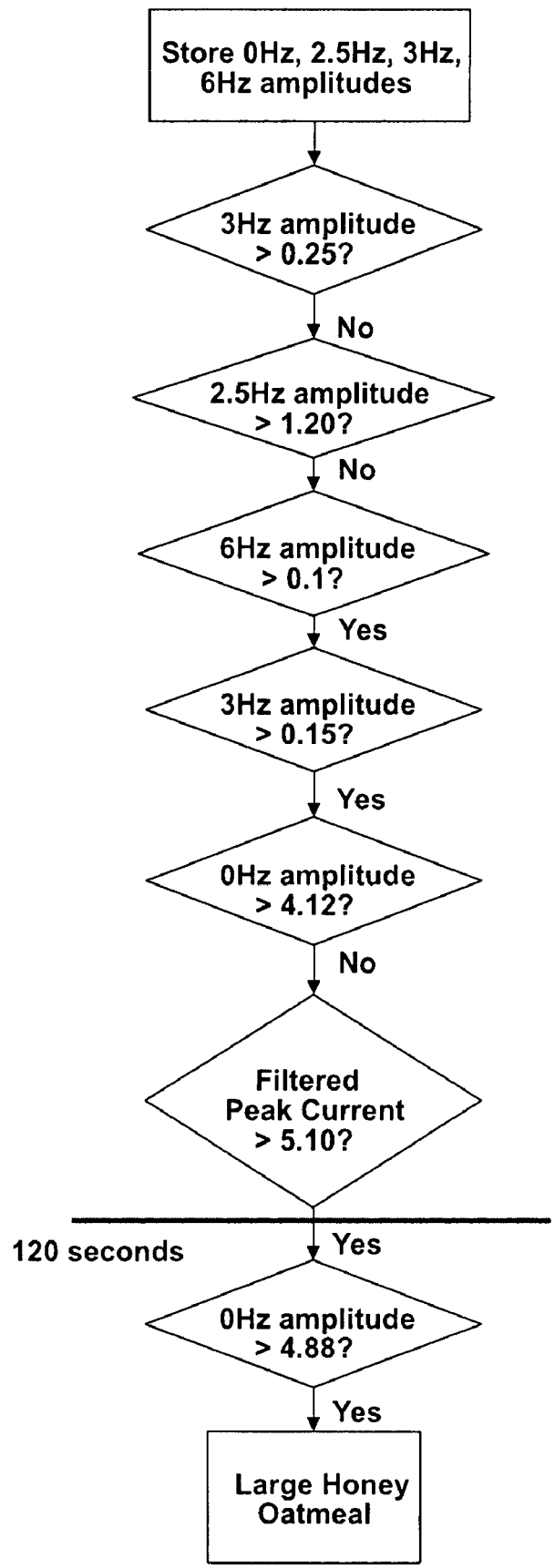
FIG. 31 is a schematic representation of the predetermined logic tree for identifying a large sized recipe of Honey Oatmeal bread dough.
Figure 32:
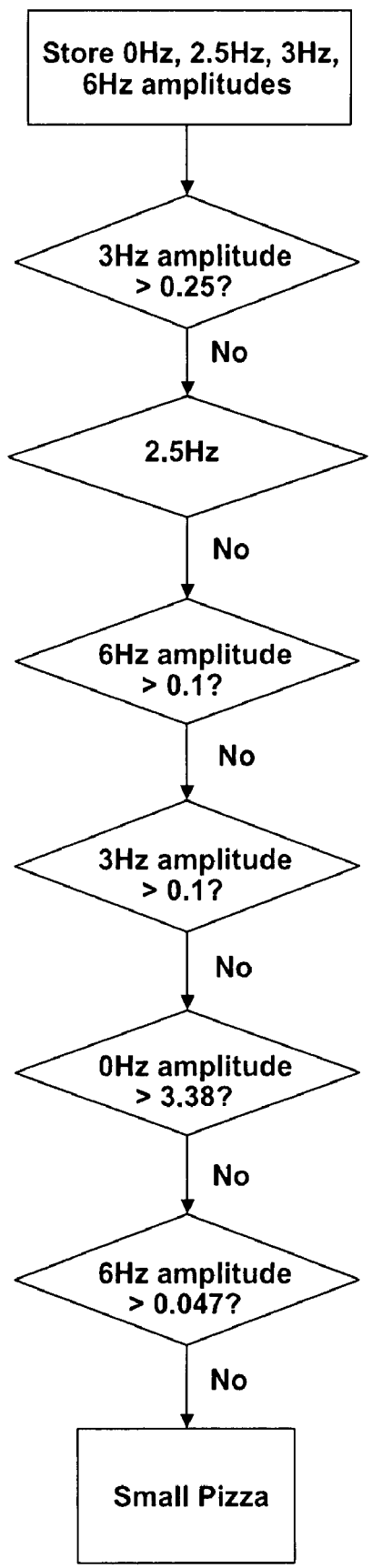
FIG. 32 is a schematic representation of the predetermined logic tree for identifying a small sized recipe of Pizza bread dough.
Figure 33:
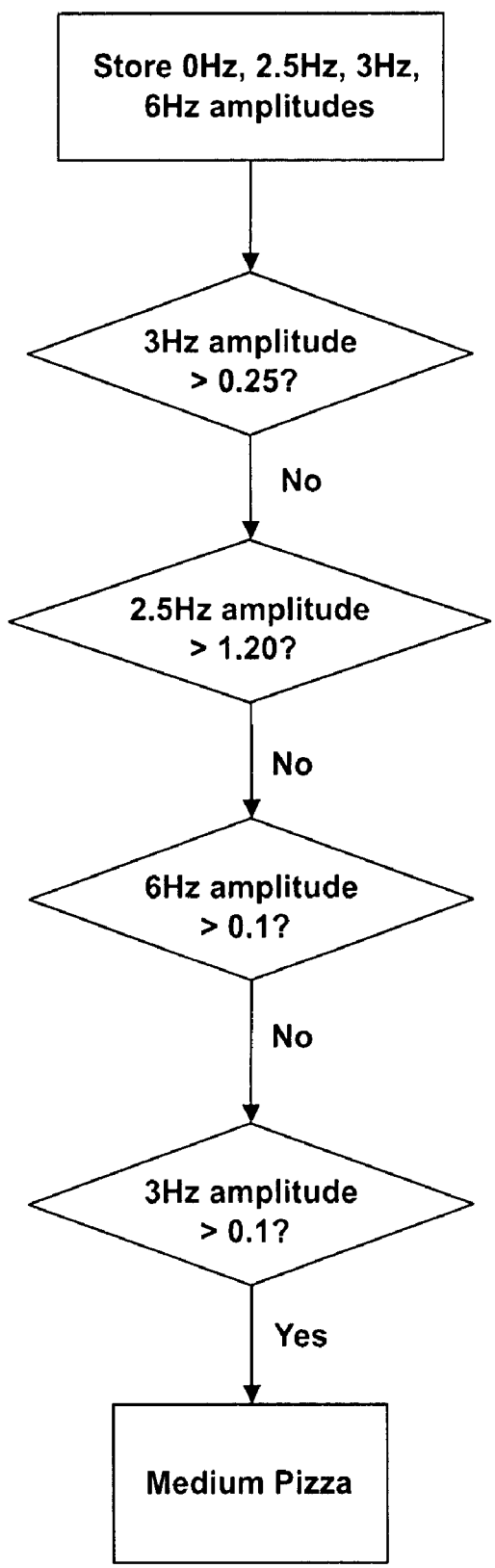
FIG. 33 is a schematic representation of the predetermined logic tree for identifying a medium sized recipe of Pizza bread dough.
Figure 34:
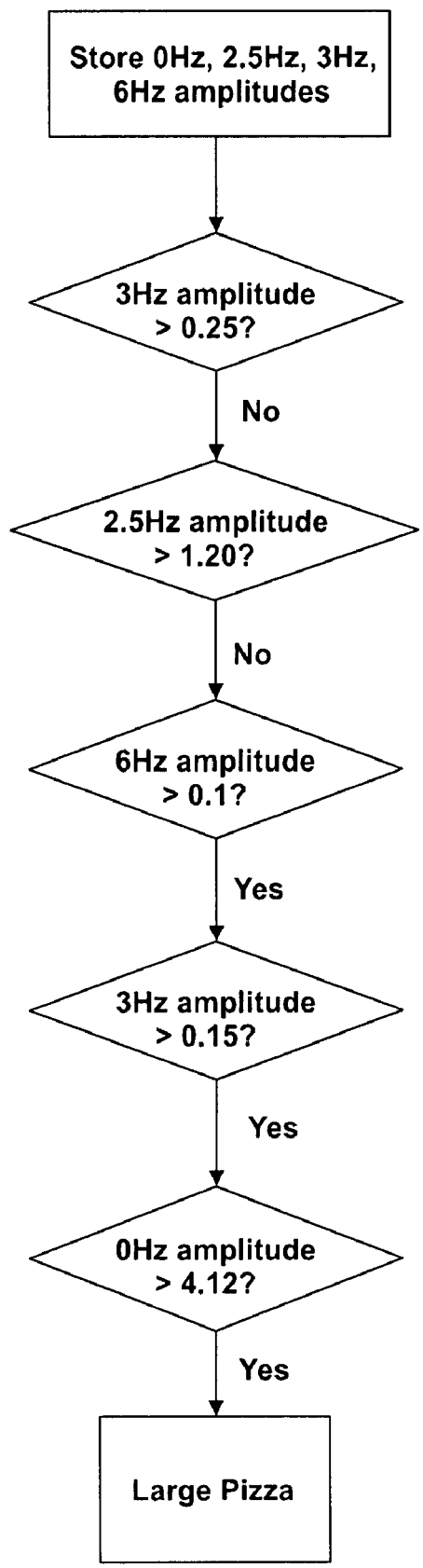
FIG. 34 is a schematic representation of the predetermined logic tree for identifying a large sized recipe of Pizza bread dough.
Figure 35:
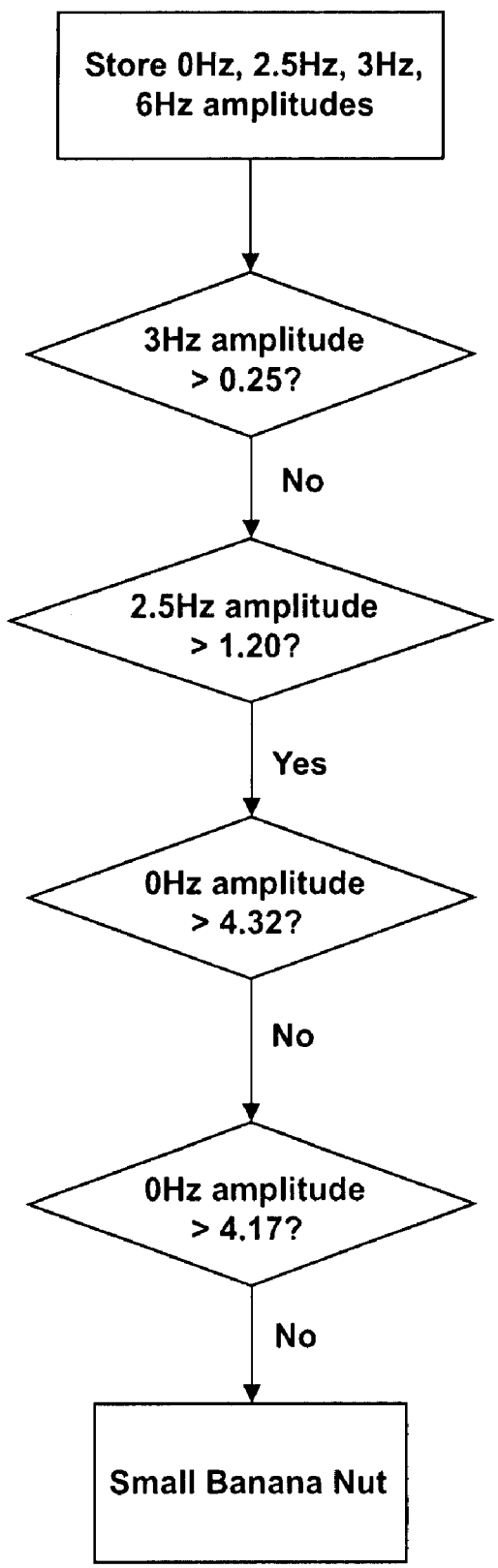
FIG. 35 is a schematic representation of the predetermined logic tree for identifying a small sized recipe of Banana Nut bread dough.
Figure 36:
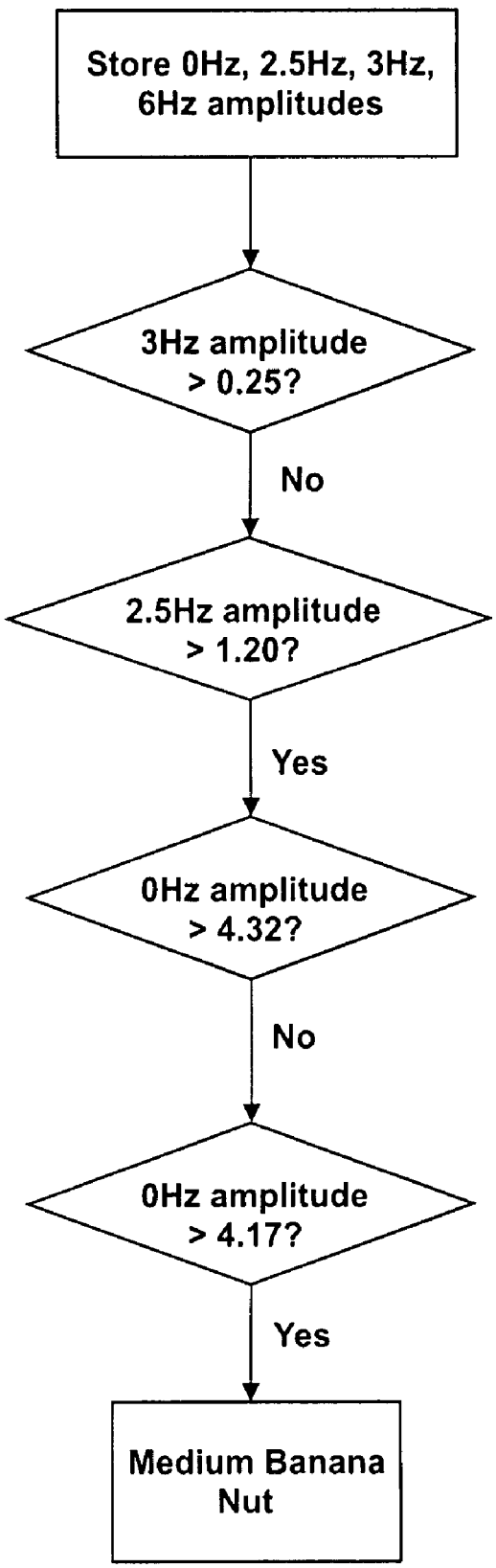
FIG. 36 is a schematic representation of the predetermined logic tree for identifying a medium sized recipe of Banana Nut bread dough.
Figure 37:
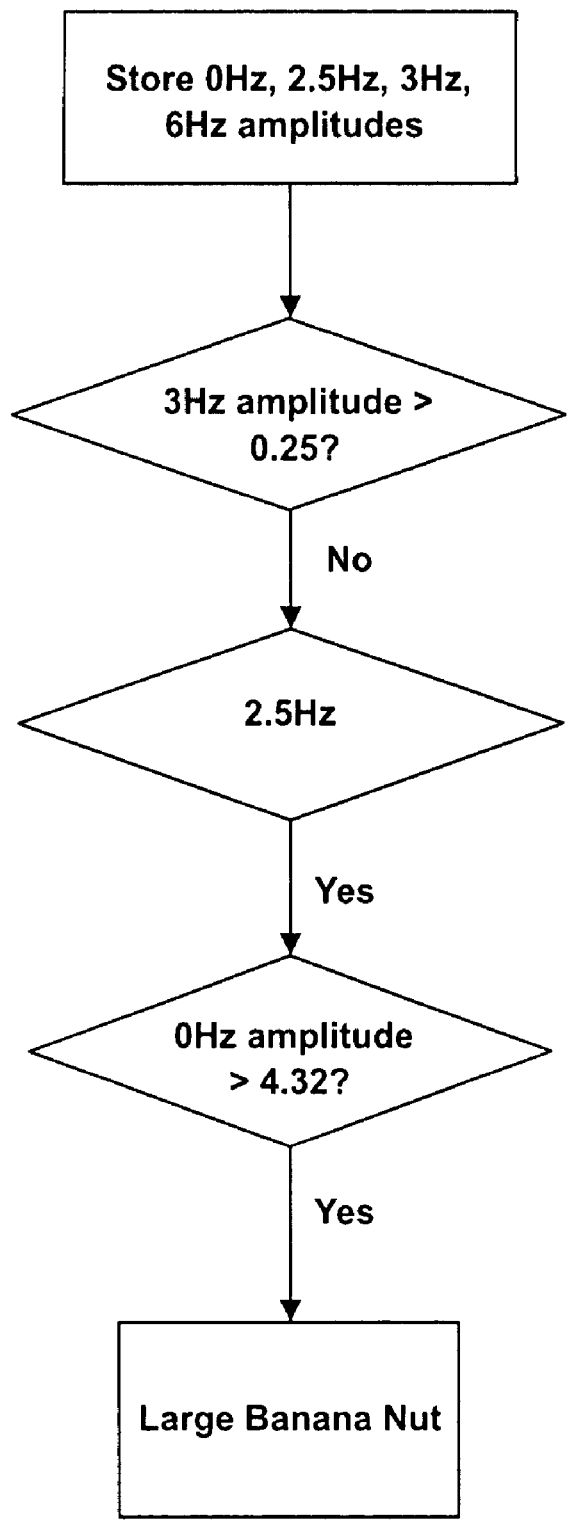
FIG. 37 is a schematic representation of the predetermined logic tree for identifying a large sized recipe of Banana Nut bread dough.

That the frequency data is suitable for determining size is illustrated by looking at FIGS. 8, 10, and 12, which illustrate the same recipe for White bread mixed for a medium, small, and large batch. The different profiles are easily seen merely by visual inspection. The same can be said by comparing the frequency domain data for the same size of White, French, and Sweet bread dough illustrated in FIGS. 8, 14, and 16, respectively.

The difference between the dough types and sizes is most dramatically illustrated when the prominent frequencies are tabulated as seen in Tables 2 and 3 below.

TABLE 2

Tabulated profile criteria for medium, small, and large sized white bread dough

| | 0 Hz (amplitude) | 2.5 Hz (amplitude) | 3 Hz (amplitude) | 6 Hz (amplitude) | Filtered Peak Current |
|---|---|---|---|---|---|
| White Medium Bread Dough | <5.25 | | >.25 | >.29 | <6.25 |
| White Small Bread Dough | | <1.2 | <.145 (at 120 seconds) | >.1 | <4.38 |
| White Large | <5.25 | | >.25 | <.29 | <7.25 |

TABLE 2-continued

Tabulated profile criteria for medium, small, and large sized white bread dough

| | 0 Hz (amplitude) | 2.5 Hz (amplitude) | 3 Hz (amplitude) | 6 Hz (amplitude) | Filtered Peak Current |
|---|---|---|---|---|---|
| Bread Dough | | | | | |

TABLE 3

Tabulated profile criteria for medium white, French, and sweet bread dough

| | 0 Hz (amplitude) | 2.5 Hz (amplitude) | 3 Hz (amplitude) | 6 Hz (amplitude) | Filtered Peak Current |
|---|---|---|---|---|---|
| White Medium Bread Dough | <5.25 | | >.25 | >.29 | <6.25 |
| French Medium Bread Dough | >5.25 | | <.25 | | |
| Sweet Medium Bread Dough | <5.25 | | >.25 | >.29 | >6.25 |

A cursory review of the tabulated profile data for White bread dough of medium, small and large sizes shown in Table 2, illustrates that each size of the same dough has a different profile. As such the controller may determine the dough size being mixed based on the data collected. Notably, the 3 Hz amplitude is determined after 120 seconds.

The foodstuff being mixed usually may be identified within the first sixty (60) second of the dough ingredients being mixed. Those that cannot be identified in the first sixty (60) seconds may be identified within the first one hundred twenty (120) seconds of the dough ingredients being mixed. The recipes that are identified within the first one hundred twenty (120) seconds are small white, small wheat, medium wheat, small honey oatmeal, medium honey oatmeal, and large honey oatmeal. All other recipes may be identified after only sixty (60) seconds. It has been contemplated that other time lengths could be used but in this instance the predetermined profiles only use these times. Therefore, most of the recipes can be detected before the dough ball forms and the instantaneous loading begins. This is advantageous because corrective measures may be taken before the instantaneous loading affects the performance of the mixer 10.

Similarly, a cursory review of the tabulated profile data for White bread, French bread, and Sweet bread dough of a medium size, shown in Table 3, illustrates that each type of dough has a different profile. As such the controller may determine the dough type being mixed based on the data collected. Thus the filtered peak current differences and frequency analysis differences have allowed applicants to develop profile characteristics to identify the foodstuff being mixed. The profiles will typically be empirically determined for different mixers, and established based upon factors such as recipe type and recipe size.

While the predetermined peak current waveforms and frequency analysis waveforms could be stored in the controller as recipe profiles and the foodstuff could be identified in that manner, storing tables of profile criteria is easier from a processing resource perspective than working with the waveforms. That is, the tabulated profiles could be sequentially compared to the real time peak current and frequency domain data to determine the type and size of dough being mixed. Even more resource efficiency can be gained by converting the tabulated filtered peak current profiles and frequency profiles into a logic tree structure, which can be implemented as a software application than runs on the processor of the mixer. The real time filtered peak current data and frequency domain data can be used as inputs to the software application to determine the type and size of bread dough.

Using the logic tree structure, while the ingredients are being mixed the machine controller 32 keeps track of the peak motor current data and determines the frequency domain data by using a Fast Fourier Transform. This may be accomplished by the machine controller 32 receiving data samples of the motor current from the sensor 36, storing the values of the peak current, determining the frequency of the current through a Fast Fourier Transform for specific signals and maintaining both the peak current data and the frequency data for a specific frequency signal. The controller takes the filtered peak current data and the frequency data and essentially forms a frequency profile for the dough being mixed. This frequency data is used as inputs to the logic tree.

FIGS. 17-37 illustrate the individual logic trees for determining each of the types and sizes of dough described herein. The logic trees are illustrated as flow charts. While the logic trees are shown on an individual bases, it should be understood that they could be combined into one large logic tree that could be easily implemented by a software program running on the controller.

The ability to identify the foodstuff being mixed benefits the improvement of the mixer performance as the operation of the mixing system may be controlled based on the foodstuff identified and actions may be taken to reduce the instantaneous loading. Once one has the ability to identify the recipe size and type, one may then manipulate the mixer operation accordingly to control the instantaneous loading. More specifically, the controller may anticipate the loading which will occur and increase the power to the motor 26 in advance of the instantaneous pinch point loading in order to smooth out the speed variations and demands placed on the motor 26 during the instantaneous loading. The instantaneous loading prediction would also allow a smaller motor 26 to be used in the mixer as the instantaneous demands on it would be lessened. Other advantages would include less audible noise when instantaneous loading is put on the motor 26 and less vibration.

Another way the recipe identification can be utilized is to have the mixer guide the user to operate the mixing system based on the identified foodstuff. For example the mixer could prompt the user either for additional ingredients or prompt the user to turn off the mixing system when the mixing is complete.

Furthermore, it has been contemplated that even without identifying the foodstuff being mixed that the mixer may be able to reduce the variations in speed and reduce the demands on the motor 26 by predicting when instantaneous loading will occur. The controller may predict when instantaneous loading will occur because the instantaneous loading is repetitive and occurs each time the mixing element comes into close proximity with a wall of the bowl 22 to form a pinch point. The controller needs only to identify the cyclical pattern of the movement of the mixing element in order to identify the pinch points that will occur. The controller may then increase the current supplied to the motor 26 in advance of those future pinch points to reduce the instantaneous loading that will occur at future pinch points and to reduce the variations in speed and demands placed on the motor 26.

The invention described herein provides an optimized mixing operation by increasing the power supplied to the motor 26 in sufficient amounts and in advance of instantaneous demands made upon the same, thereby reducing the speed variations, audible noise and vibration of the mixer. Thus, the foodstuff being mixed is mixed more efficiently and better thereby saving the consumer costs related to mixing. Finally, the utilization of motor current in identifying a foodstuff recipe requires no additional instrumentation, thereby minimizing additional cost, and could also allow user interaction with the mixer. The invention simply utilizes readily available information in a new manner to control an operation in order to optimize the mixers performance.

While the invention has been specifically described in connection with certain specific embodiments thereof, understand that this constitutes an illustration and not a limitation. Reasonable variation and modification are possible within the scope of the forgoing disclosure and drawings without departing from the spirit of the invention defined in the appended claims.

What is claimed is:

1. A method of reducing speed variation for a mixing system comprising a mixing element received within a bowl and rotational driven by a motor to mix a foodstuff in the bowl, the method comprising:

operating the motor at a set speed;
predicting the occurrence of an increased load on the motor; and
increasing the motor power prior to the occurrence of the increased load to reduce the variation of the motor speed from the set speed.

2. The method according to claim 1, wherein the predicting step comprises predicting the occurrence of an increased load attributable to a foodstuff interacting between the bowl and the mixing element.

3. The method according to claim 1, wherein the predicting step comprises identifying when the mixing element is within close proximity of a wall of the bowl to form a pinch point.

4. The method according to claim 3, wherein the predicting step comprises identifying a cyclical pattern to the movement of the mixing element relative to the bowl and the corresponding pinch points.

5. The method according to claim 1, wherein the power is increased an amount sufficient to substantially smooth out variations in a motor speed curve for the motor.

6. The method according to claim 1, wherein the power is increased by increasing the current supplied to the motor.

* * * * *